United States Patent [19]

Catiller et al.

[11] 4,430,710
[45] Feb. 7, 1984

[54] SUBSYSTEM CONTROLLER

[75] Inventors: Robert D. Catiller, Garden Grove; Craig W. Harris, El Toro; Ronald D. Mathews, Mission Viejo, all of Calif.

[73] Assignee: Burroughs Corporation, Detroit, Mich.

[21] Appl. No.: 295,586

[22] Filed: Aug. 24, 1981

[51] Int. Cl.³ .......................... G06F 3/00; G06F 3/04
[52] U.S. Cl. .................................................. 364/200
[58] Field of Search ............................... 364/200, 900

[56] References Cited

U.S. PATENT DOCUMENTS

| | | | |
|---|---|---|---|
| 3,967,250 | 6/1976 | Senda et al. | 364/200 |
| 4,047,158 | 9/1977 | Jennings | 364/200 |
| 4,056,843 | 11/1977 | Bishop et al. | 364/200 |
| 4,060,849 | 11/1977 | Bienvenu et al. | 364/200 |
| 4,162,520 | 7/1979 | Cook et al. | 364/200 |
| 4,200,930 | 4/1980 | Rawlings et al. | 364/200 |
| 4,225,918 | 9/1980 | Beadle et al. | 364/200 |
| 4,254,462 | 3/1981 | Raymond et al. | 364/200 |

*Primary Examiner*—Mark E. Nusbaum
*Assistant Examiner*—Jameson Lee

*Attorney, Agent, or Firm*—Alfred W. Kozak; Nathan Cass; Kevin R. Peterson

[57] ABSTRACT

A dual-processor, general purpose mini-computer which is programmed as a front-end data communications processor and is called a Network Support Processor. Data transfer commands received from a main host computer are executed and result messages are returned to the main host computer by the Network Support Processor. A base connection module providing slide-in connector cards houses and supports circuit cards which make up the Network Support Processor. These cards include a master controller which includes a master processor card, a master memory control card and an Interface Card which connects to a main host computer and to one or more line communications processors, each of which may handle up to 16 data communications lines. A slave controller likewise includes a slave processor circuit card, and a slave memory control circuit card. A series of slide-in memory cards forming a shared memory storage means connect to both the master and the slave memory control circuit cards.

6 Claims, 18 Drawing Figures

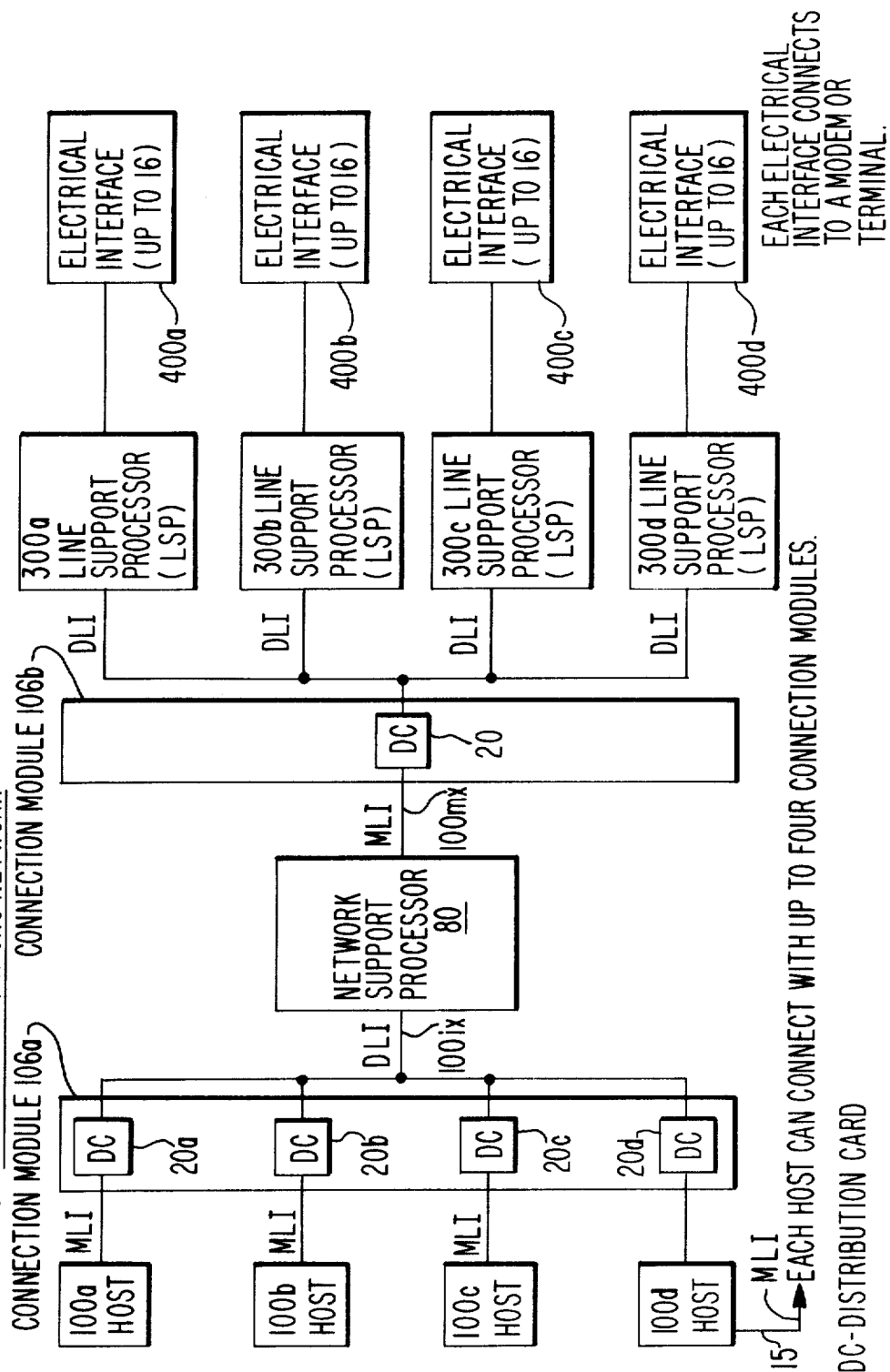
FIG. 1A. DATA COMMUNICATIONS NETWORK

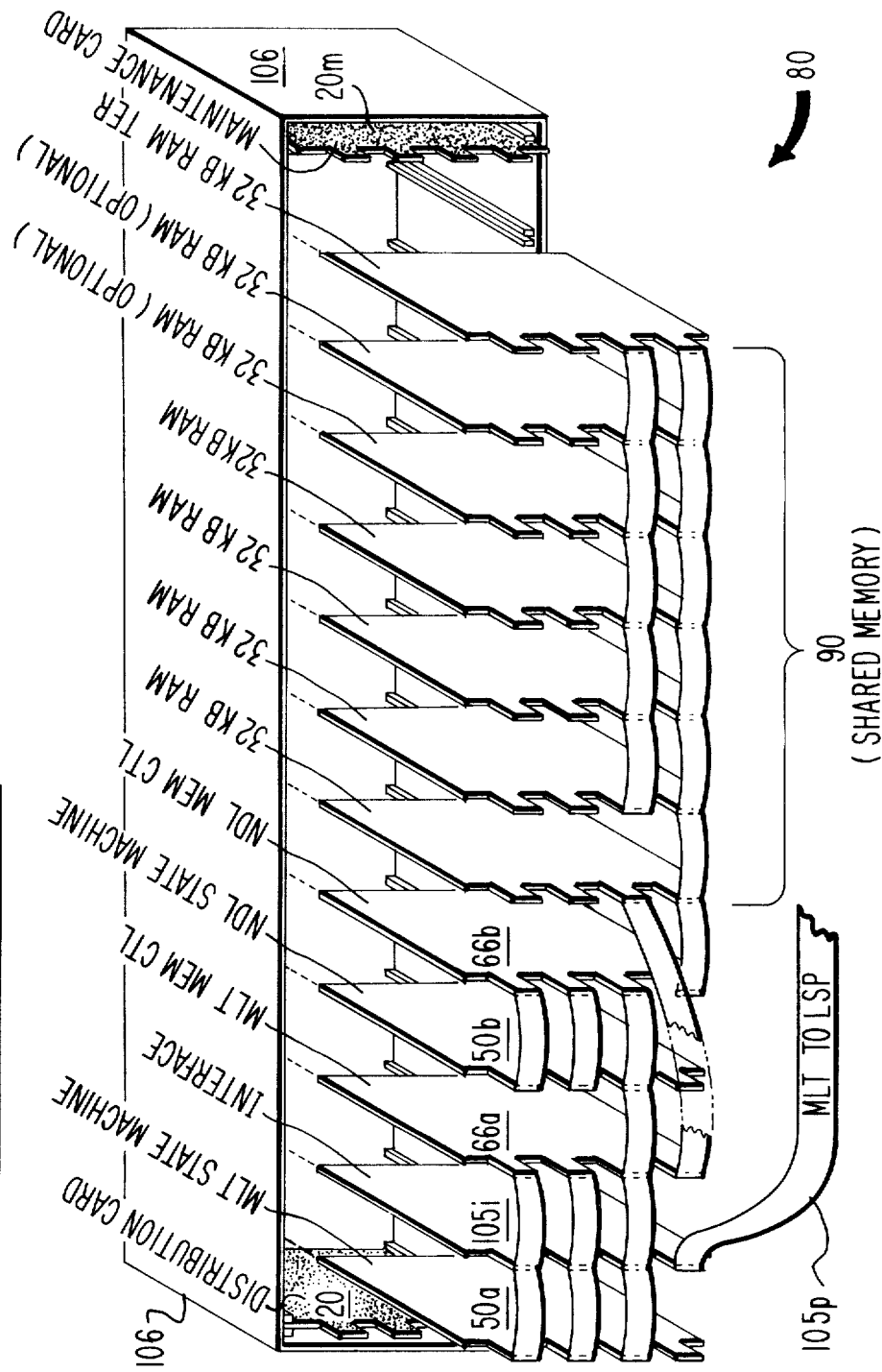
FIG.1B. NETWORK SUPPORT PROCESSOR.

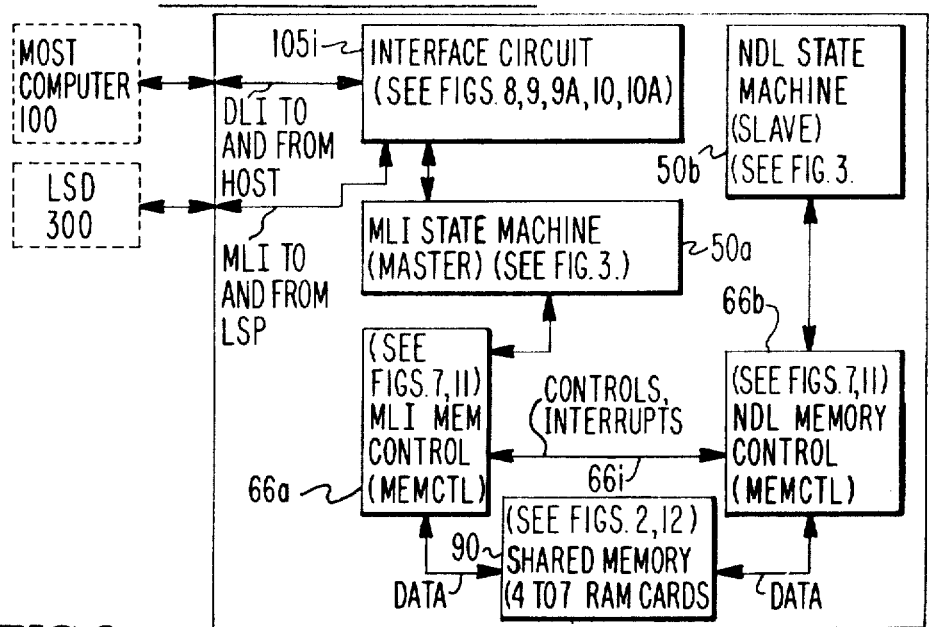
FIG.2. NSP CARD LEVEL BLOCK DIAGRAM.
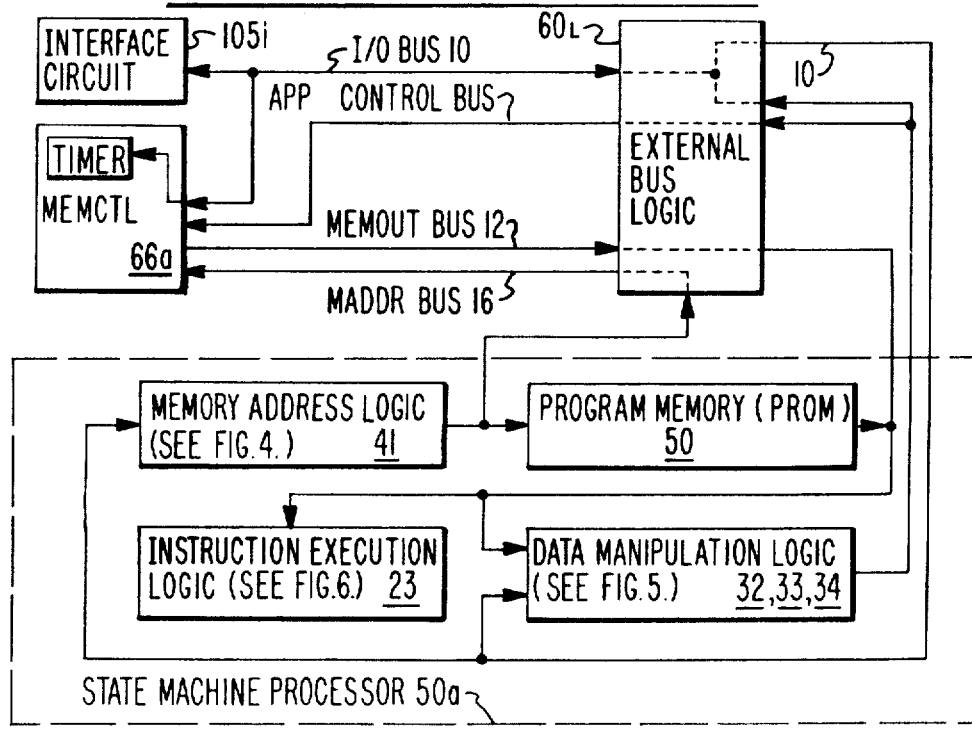
FIG.3. STATE MACHINE PROCESSOR AND ADJACENT UNITS.

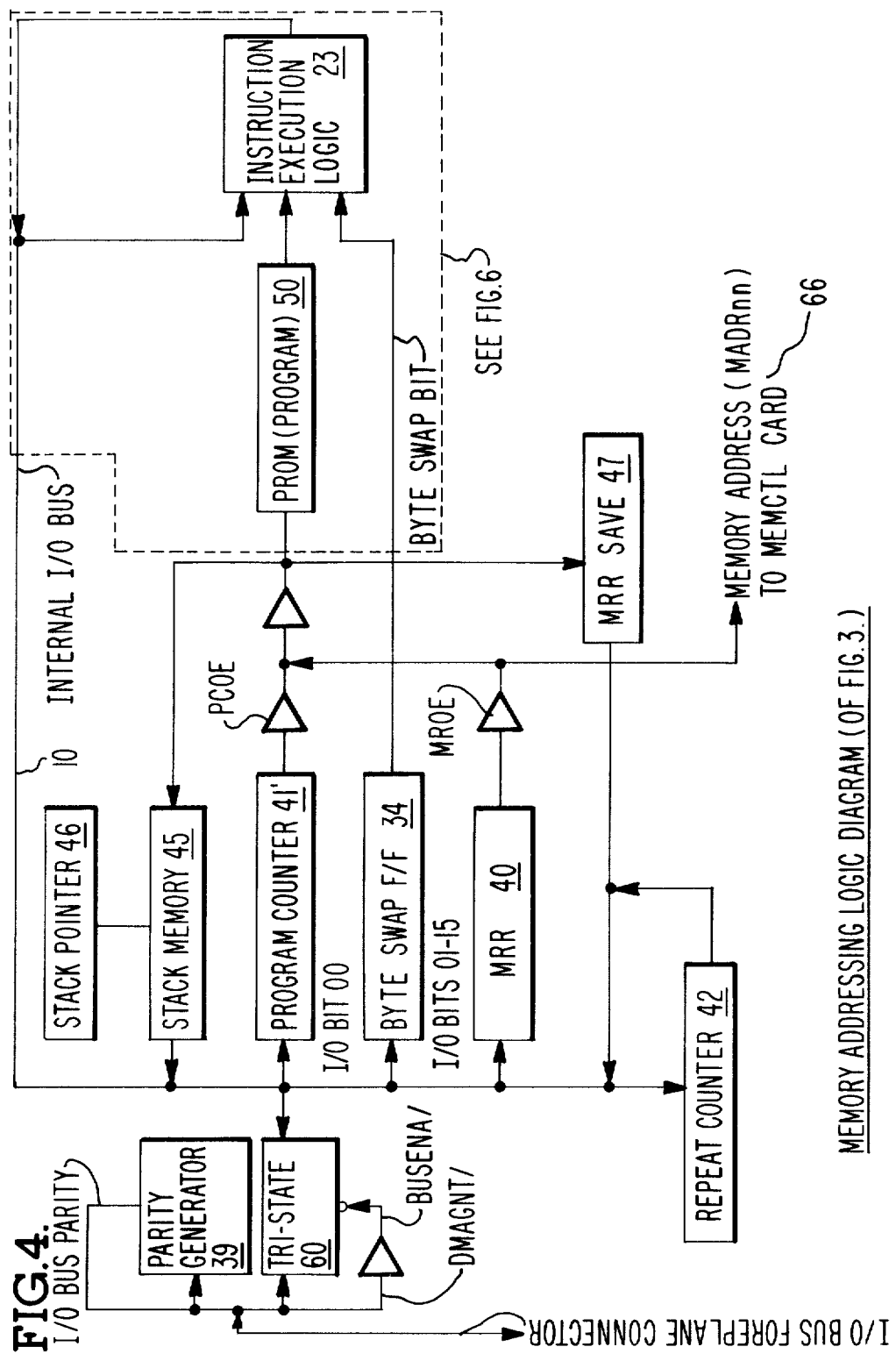

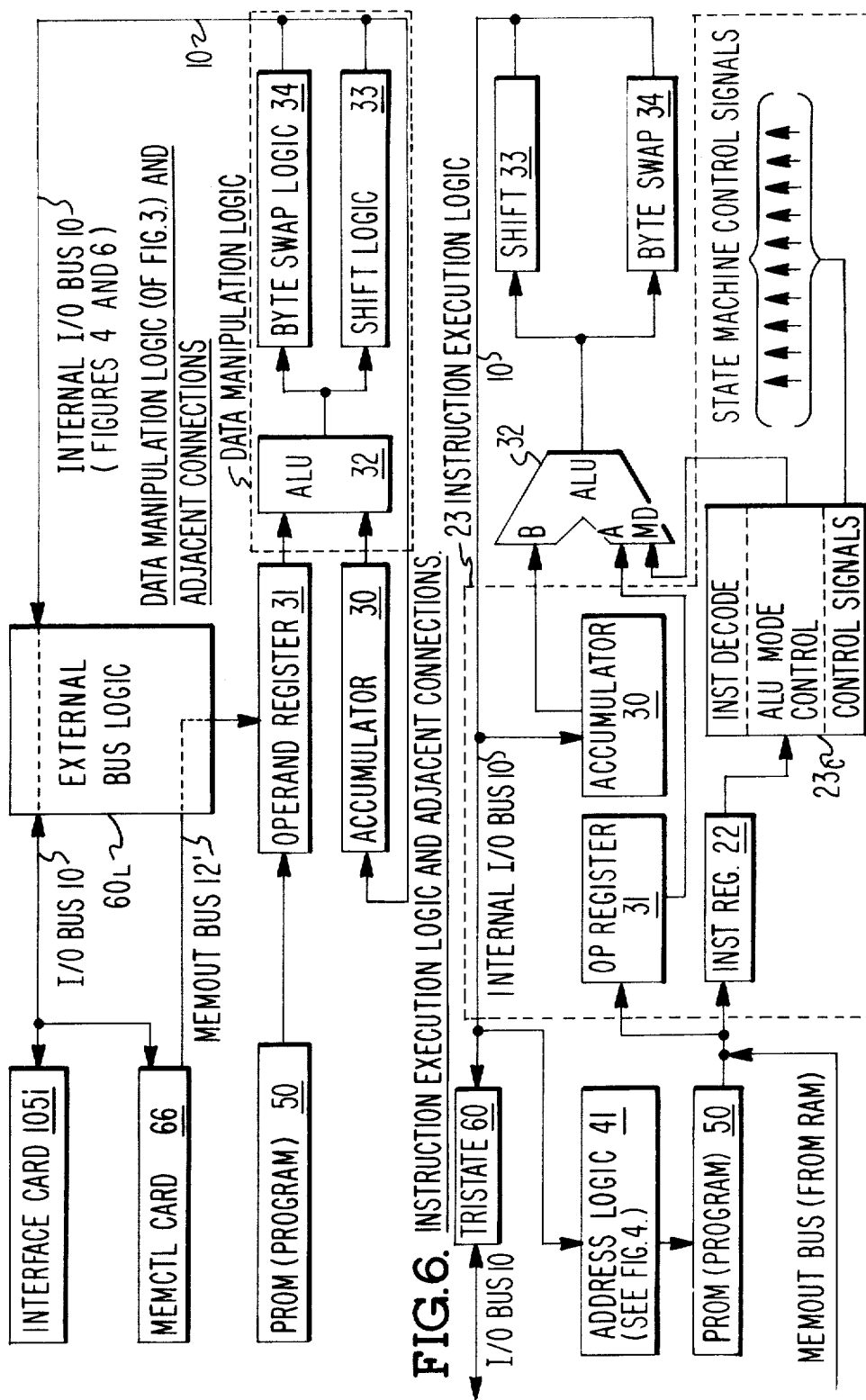

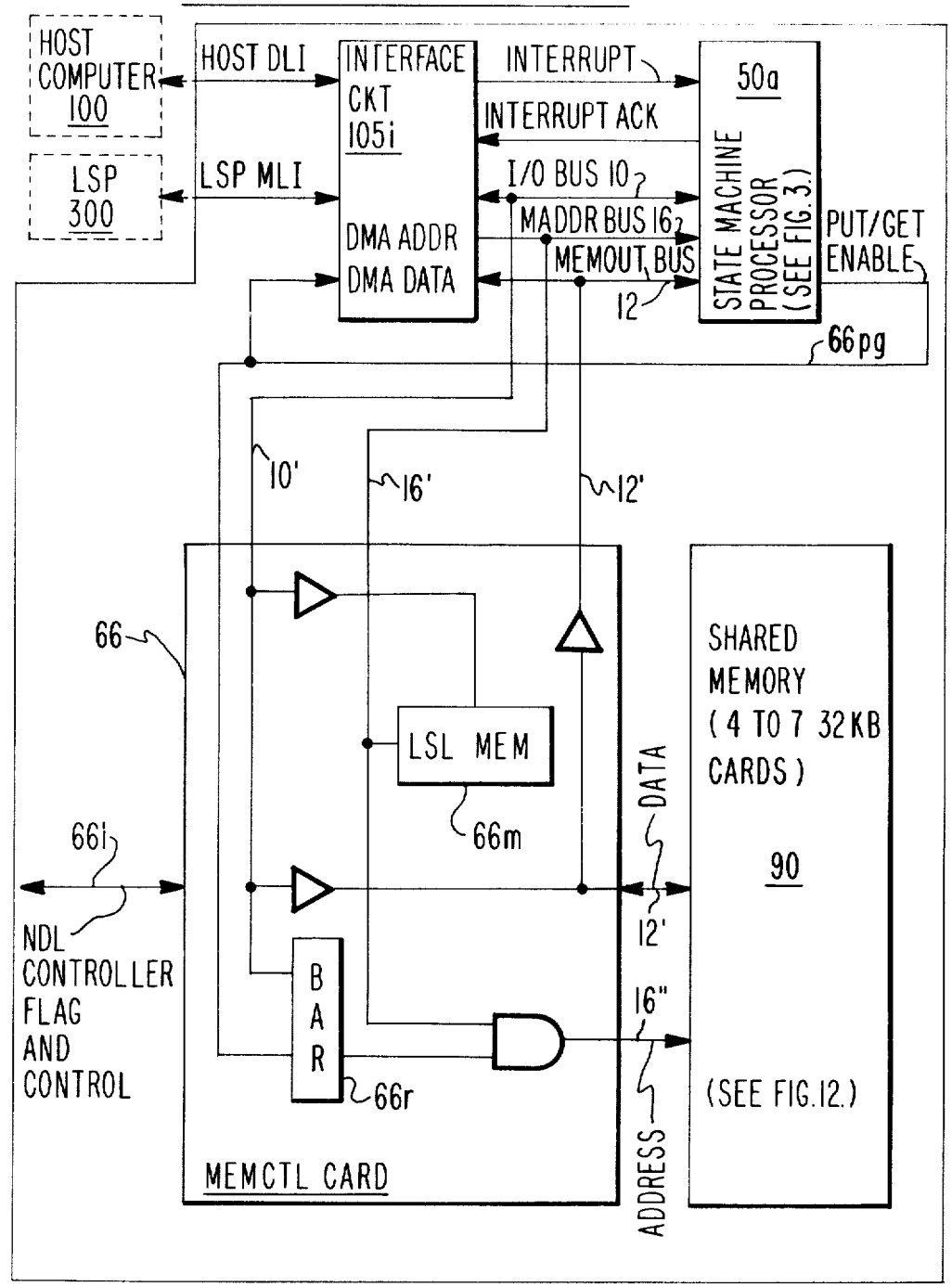
FIG. 7. EXTERNAL BUS LOGIC BLOCK DIAGRAM.

FIG.8. INTERFACE CARD (105i) BLOCK DIAGRAM (105i)
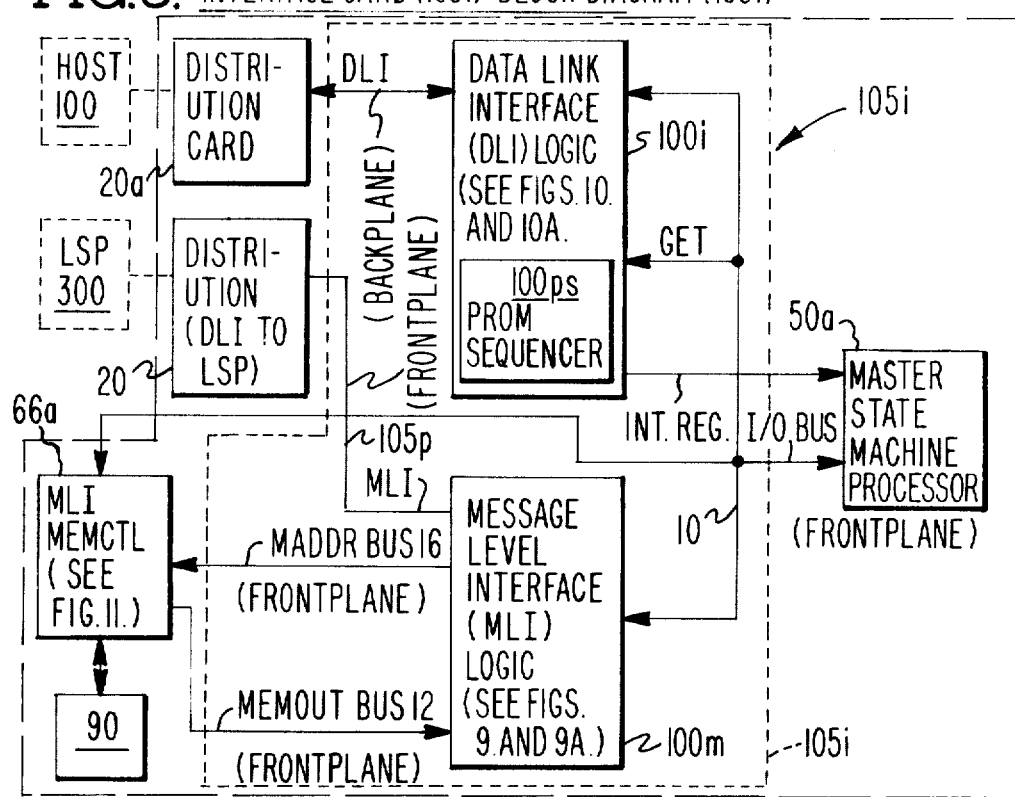
FIG.12. 32 KB RAM BLOCK DIAGRAM.
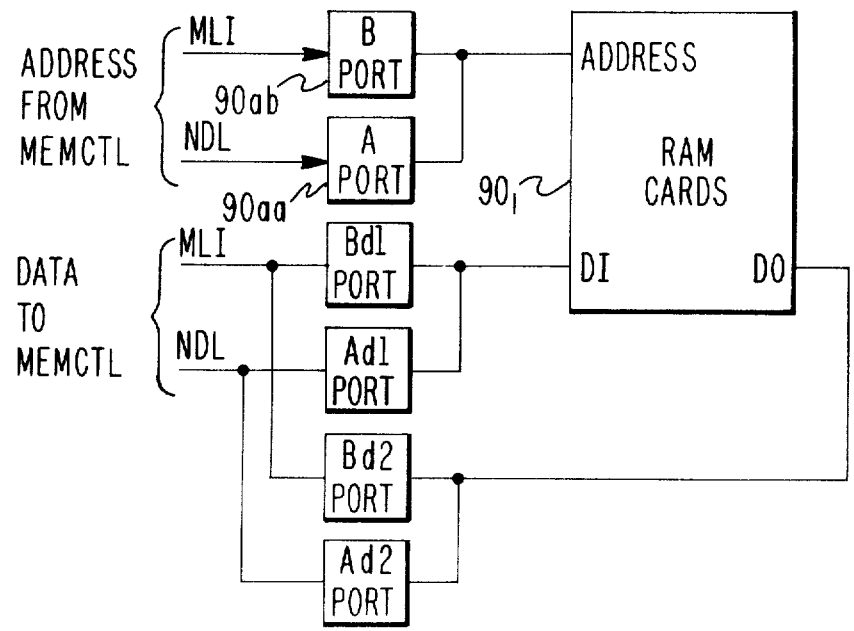

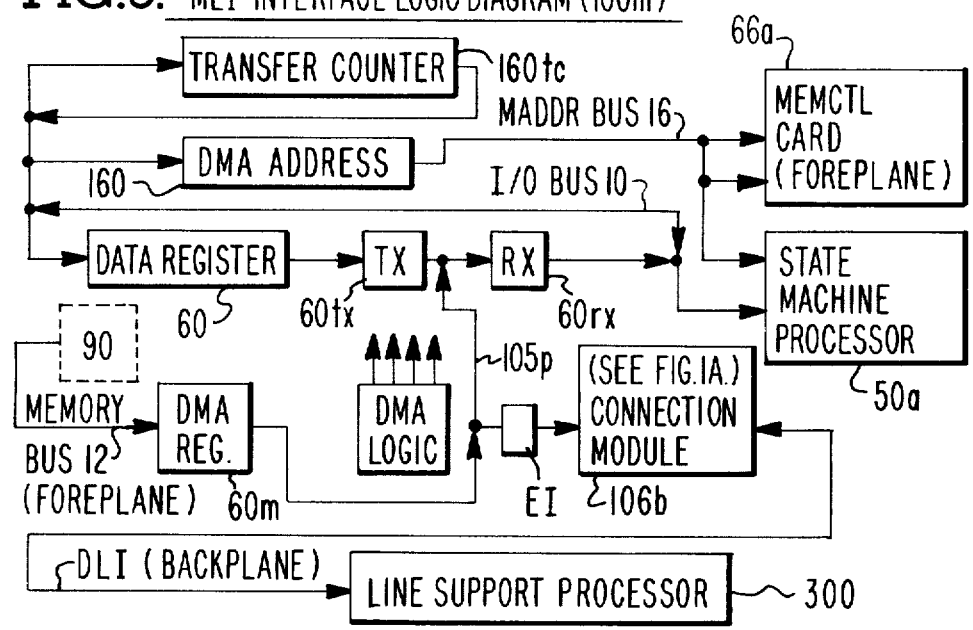
FIG. 9. MLI INTERFACE LOGIC DIAGRAM (100m)
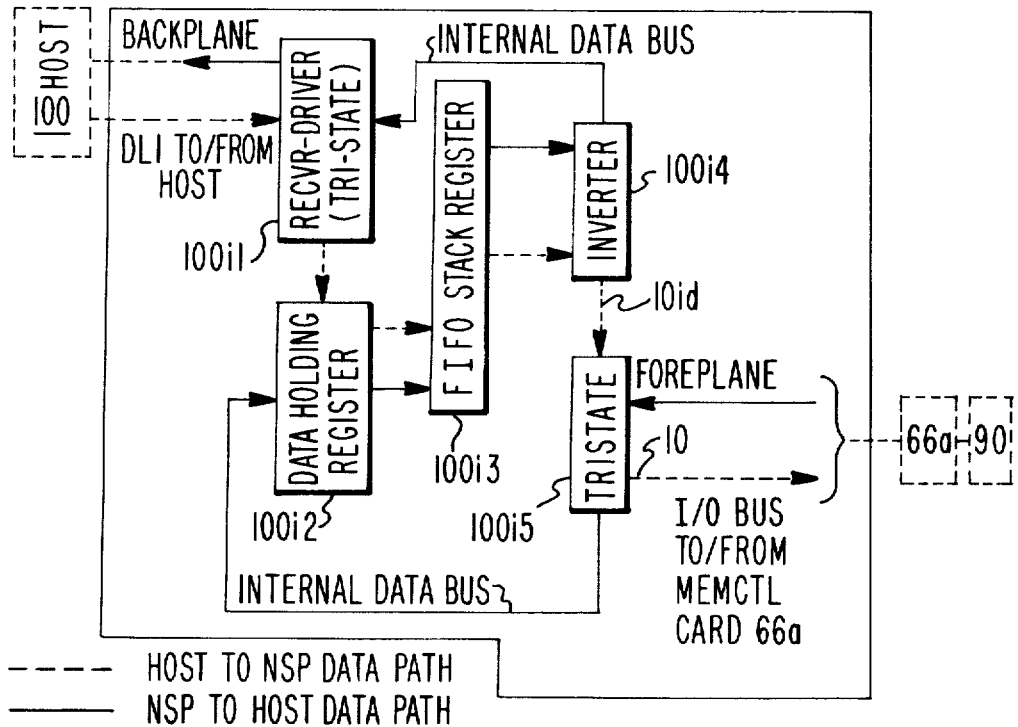
FIG. 10. DLI BLOCK DIAGRAM (100i) DATA PATH
- - - - HOST TO NSP DATA PATH
———— NSP TO HOST DATA PATH

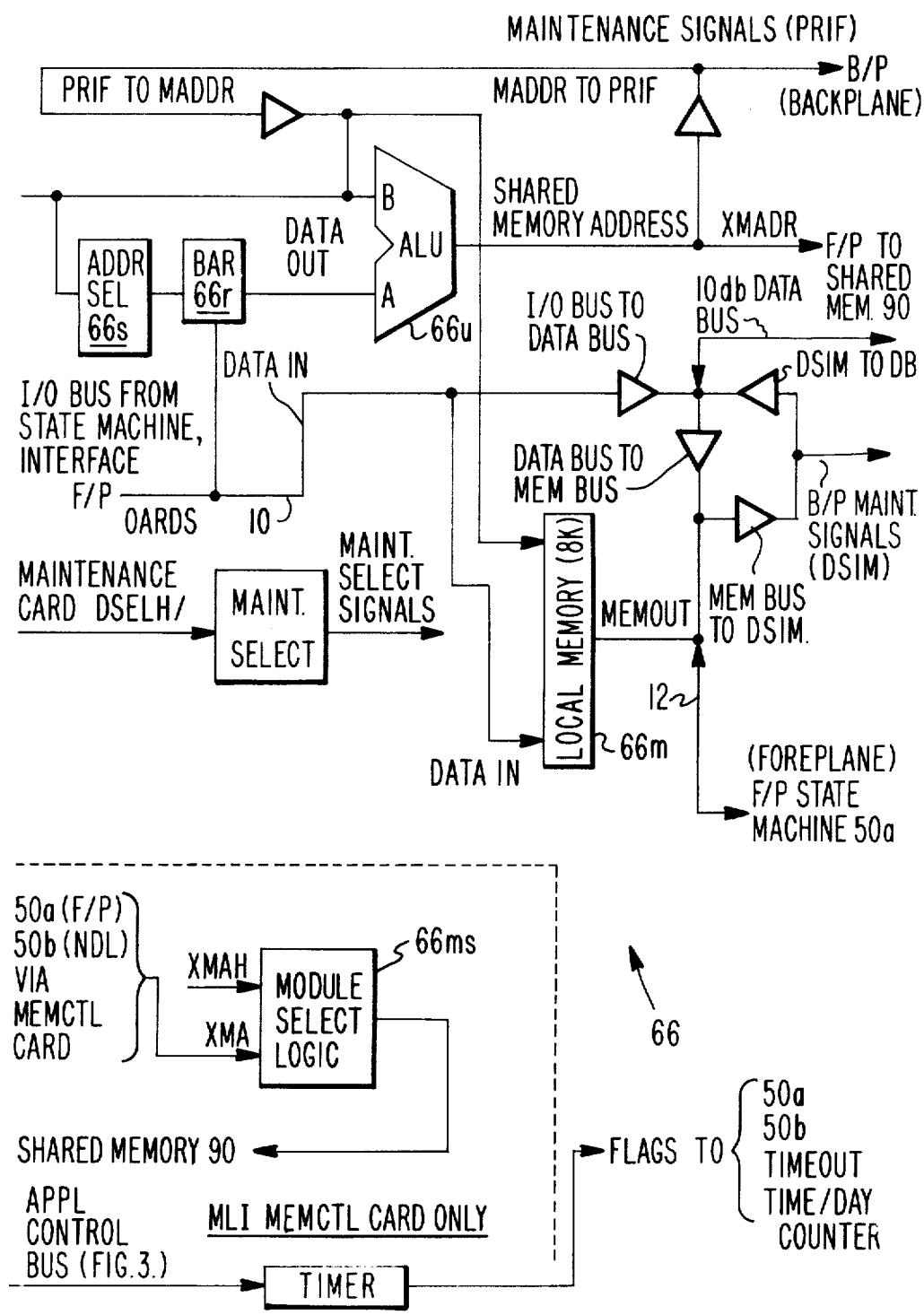
FIG.11. MEMCTL BLOCK DIAGRAM.

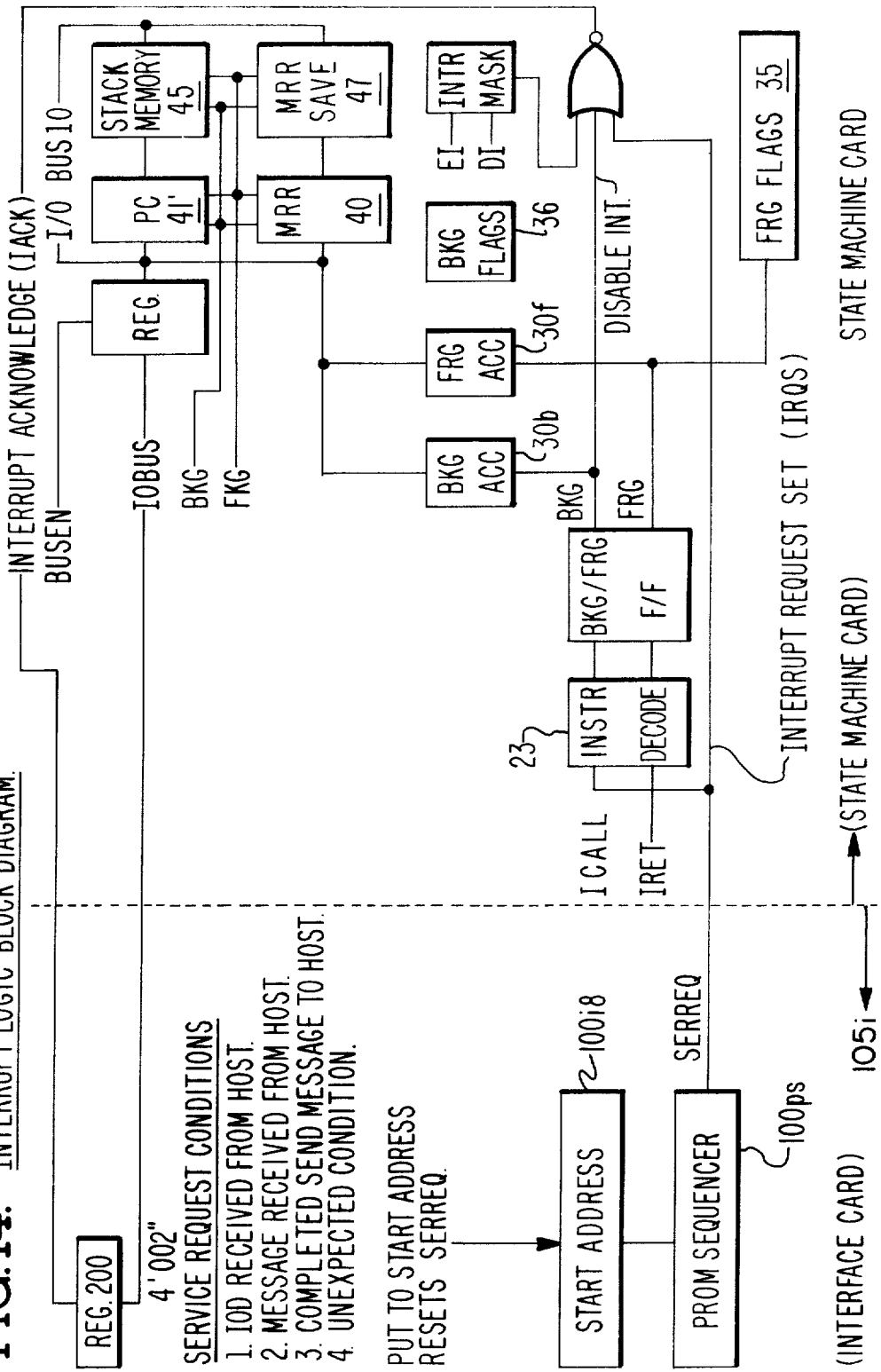
FIG. 14. INTERRUPT LOGIC BLOCK DIAGRAM.

FIG.15. MEMORY LOCATIONS.
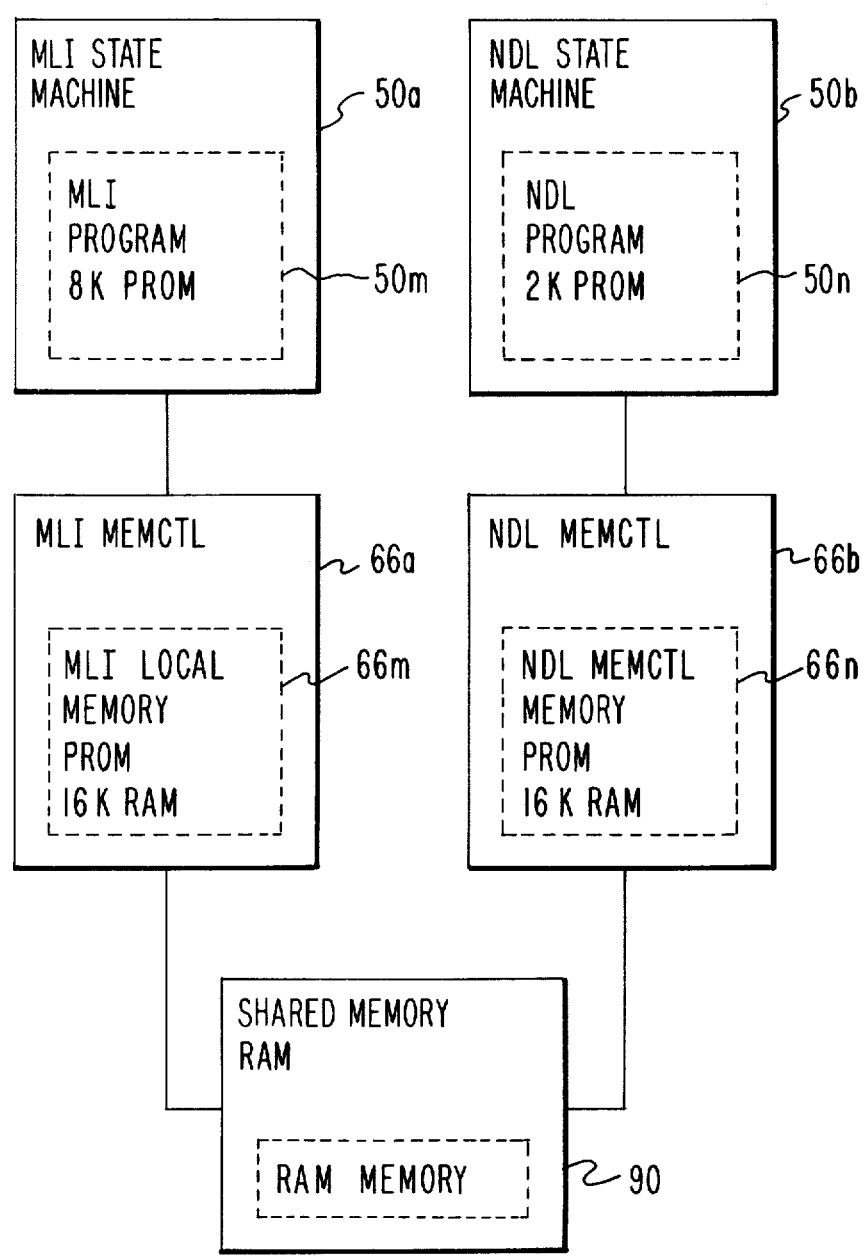

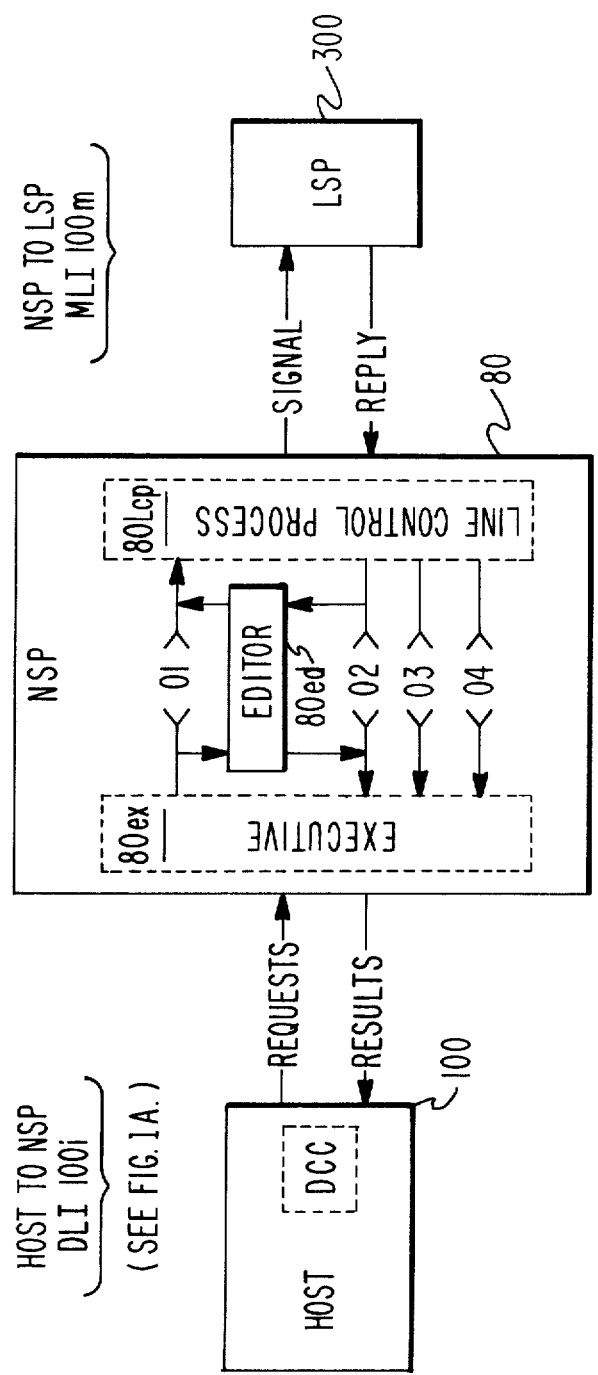
FIG. 16. MESSAGE TRANSFER BLOCK DIAGRAM.

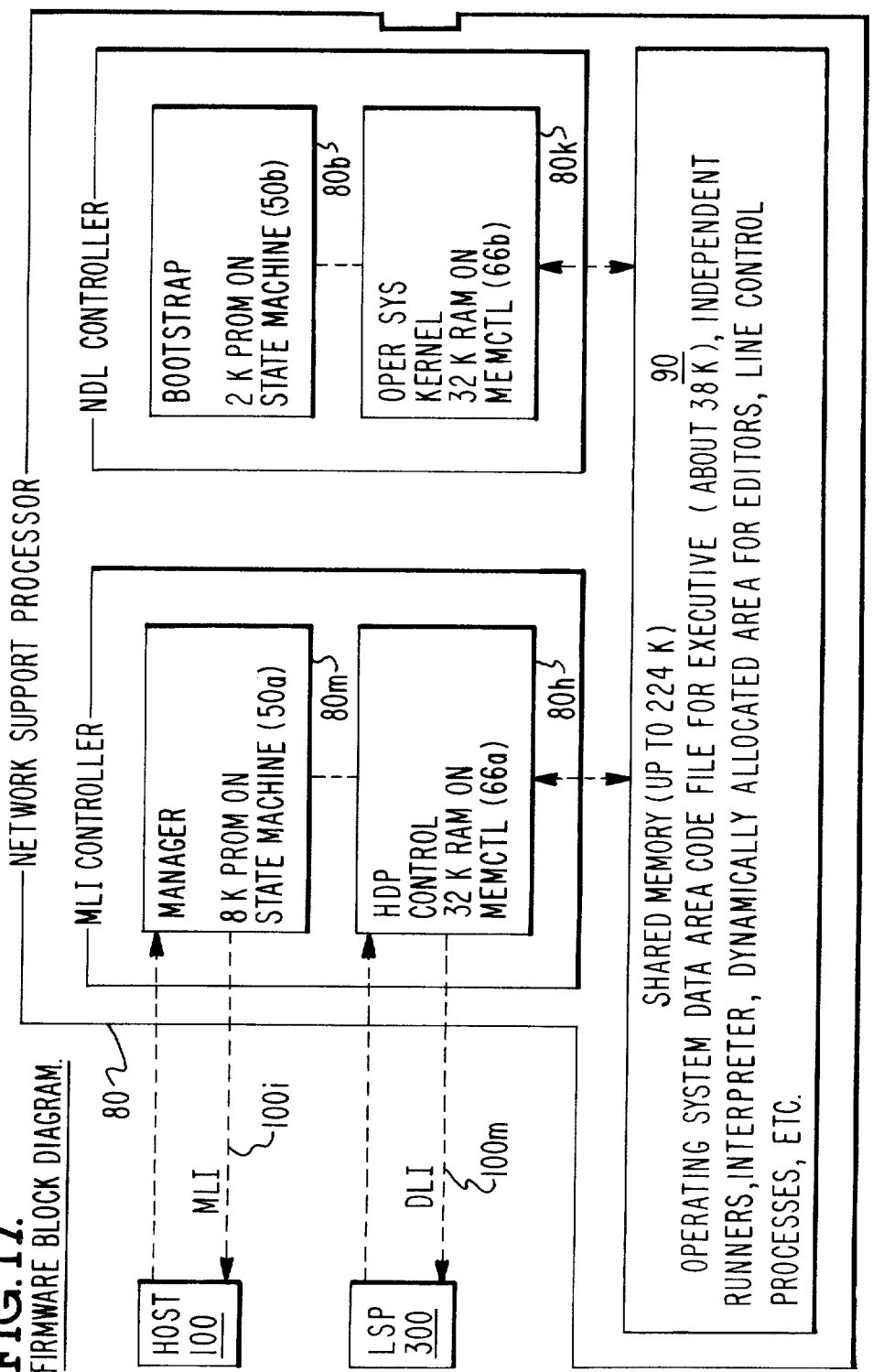
FIG. 17. FIRMWARE BLOCK DIAGRAM.

SUBSYSTEM CONTROLLER

FIELD OF THE INVENTION

This invention relates to a subsystem controller for data communications systems whereby a plurality of host computers can communicate with data-communication terminals by means of a data comm I/O subsystem using specialized types of processor-controllers.

CROSS REFERENCE TO RELATED APPLICATIONS AND PATENTS

This application is technically related to a number of patent applications and prior issued patents. The related patent applications and patents include:

"Micro-Processor System Facilitating Repetition of Instructions", inventors Robert Catiller and Brian Forbes, U.S. Pat. No. 4,292,667;

"Microprocessor System with Source Address Selection", inventors Robert Catiller and Brian Forbes, U.S. Pat. No. 4,290,106;

"Microprocessor Having Word and Byte Handling," inventors Robert Catiller and Brian Forbes, U.S. Pat. No. 4,301,505;

"Digital System for Data Transfer Using Universal Input/Output Microprocessor", inventors Robert Catiller and Brian Forbes, U.S. Pat. No. 4,293,909;

"Microprocessor System with Specialized Instruction Format", inventors Brian Forbes and Robert Catiller, U.S. Pat. No. 4,291,372;

"Memory Control Circuit for Subsystem Controller", inventor Ronald Mathews, filed Aug. 24, 1981, Ser. No. 295,588;

"Data Communications Network", inventors Robert Catiller, Craig Harris and Ronald Mathews, filed Aug. 24, 1981, Ser. No. 259,587;

"I/O Subsystem Using Data Link Processors", inventors Kenneth Baun and Donald Millers II, U.S. Pat. No. 4,313,162.

"Interface Circuit for Data Communications Subsystems", inventors Craig Harris, Ronald Mathews, Robert Catiller, filed Dec. 1, 1981 as U.S. Ser. No. 326,423.

The following issued patents which involve the use of an Input/Output Subsystem connecting a main host computer with remote terminal units are included herein by reference:

U.S. Pat. No. 4,162,520, entitled "Intelligent Input/Output Interface Control Unit for Input/Output Subsystem", inventors Darwin Cook and Donald Millers II. This case described the peripheral-controller known as a line Control Processor which controls and handles data transfers between a given peripheral terminal unit and a main host system.

U.S. Pat. No. 4,074,352, entitled "Modular Block Unit for I/O Subsystem", inventors Darwin Cook and Donald Millers II. This case described a Base Module unit which housed and supported a group of eight peripheral-controllers and interfaced them to a main host computer system.

U.S. Pat. No. 4,106,092, entitled "Interface System Providing Interfaces to Central Processing Unit and Modular Processor Controllers for I/O Subsystem," inventor Donald Millers II. This patent describes the unit in the main host system, designated as an I/O Translator or "IOT" which controls and regulates data transfer between the main host system and a plurality of base modules and their peripheral controllers.

U.S. Pat. No. 4,189,769, entitled "Input/Output Subsystem for Digital Data Processor System", inventors Darwin Cook and Conald Millers II. This case describes a subsystem wherein a plurality of peripheral-controllers (called Line Control Processors) are organized in base modules for data communication with a main host system. The peripheral-controllers and the base modules form an Einput/output subsystem for controlling data transfers to/from a large number of peripheral units to the main host computer system.

U.S. Pat. No. 4,280,193, entitled "Data Link Processor for Magnetic Tape Data Transfer System", inventors Kenneth W. Baun, Jimmy G. Saunders. This patent describes an improved peripheral-controller called a Data Link Processor which handled data transfers between a main host computer and remote magnetic tape peripheral units.

The above issued patents form a foundation and background for the present application and are included by reference into this specification. These patents describe and discuss many of the elements of the data communication network and the functional operations whereby a main host computer provides I/O descriptor commands, data link work task identifiers, and receives back result descriptor words to indicate the completion or incompletion of any job task. These patents also describe the use of base connection module units which house slide-in cards which form processor-controllers, distribution control cards, maintenance cards, and other slide-in card units. Each base module unit houses one or more processor-controllers and provides a distribution control (DC) card for connection and disconnection to a main host computer and also provides a maintenance card for diagnostic testing of the circuitry in the base module.

These card units have been described in the above cited patents which are included herein by reference.

BACKGROUND OF THE INVENTION

By the use of the term "communication discipline" there is meant the set of rules or criteria governing the message format used by a particular remote peripheral device in its data transfer operations via communication lines to a central station with its main host computer. Some of the factors differentiating the various communication disciplines involved are: synchronous operation, synchronization, asynchronous operation, start and end of message sequence, message segment length, and so on.

Since there is no standard communication discipline which is common to all peripheral data communication terminals, it was generally required that a system include individually separate communication controllers to accommodate each different discipline handled by the system. Further, since new types of peripherals with different disciplines are often developed, this would in turn require that a new communications controller be designed on a system to accommodate this type of unit.

It has long been the purpose of those manufacturers and users of data communication networks and subsystems to increase the throughput of data per unit time and per unit amount of equipment; also to simplify and economize in the number of elements involved while providing reliable data communications to and from remote stations in the most efficient manner.

Many data communication subsystems have used controllers, not only to handle the individual idiosyncrasies of the various types of data-comm peripheral terminals, but also have used controllers with insufficient control capabilities such that the main host computer must continually be actively involved with every step of the process involving data transfers to and from the remote terminal devices.

As indicated in the previously referenced patents, one way of reducing the complexity and cost, in addition to getting better controllability of a data communications network, is to relieve the main host processor of most of its monitoring and control functions and to place them in the hands of peripheral-controllers which maintain communication capability with remote terminal devices and which, at selected times, communicate back to the main host system to send data or to receive data from it.

Often problems arise as to just how the architectural and functional structure of a network should be arranged to provide the most efficient use of components for data transfers between remote terminals and a central main host computer or a plurality of such host computers.

The presently described data communication network which permits one or more main host computer systems to operate a large plurality of remote terminal devices for data communication purposes, provides modular circuitry for controlling data transfers whereby up to 16 data communication lines from remote terminals are connected to 16 line adapters which are part of a Line Support Processor which sees to it that the various different line communication disciplines are satisfied and which then provides a common line discipline for operations with a Network Support Processor. The Network Support Processor receives initiating data transfer instructions from either a single main host processor or any one of a plurality of up to four main host processors, and sees to the execution of the required data transfers between remote data terminals and the particular host computer which initiated the data transfer instruction. Communications between the Line Support Processor and the Network Support Processor are standardized and not subject to vagaries of the various disciplines required for the remote data communication terminals. The Network Support Processor and its satellite Line Support Processors constitute front-end controllers which permit distributed processing functions to occur in the architecture of the communication network.

A basic building block of the described data communication network is a Subsystem Controller designated as the Network Support Processor which relieves the main host computer of involvement with data transfer functions.

SUMMARY OF THE INVENTION

The Network Support Processor (NSP) of this invention is a Subsystem Controller for a data communications network. The Network Support Processor is a connecting control link between a single main host computer (or a plurality of main host computers) and provides control and connection to one, or up to four line communications processors (here designated as Line Support Processors, LSP) each of which can control up to 16 line adapters. Each line adapter handles a specific data communications line to a remote terminal by providing the proper communication protocol for the remote data unit. The Network Support Processor is a dual processor unit which uses a processor designated as a universal input-output state machine (UI-OSM) described in the previously referenced patents, and especially in U.S. Pat. No. 4,301,505 at columns 2, 7-10, and FIGS. 2A, 2B and 3 which describe the structure and operation of the state machine processors hereinafter called the master and slave processors. Supplementing the dual-processors, the Network Support Processor also provides dual memory control circuits for sharing a shared memory means and also provides an Interface Circuit Card which provides logic for connection and synchronous communication via Distribution Card $20_{abcd}$, to the main host computer system on the one hand and for connection and asynchronous communication to the Line Support Processors via Distribution Card 20 on the other hand. The dual processors are respectively designated as the MLI state machine and the NDL state machine (which refers to message level interface, MLI, and to network definition language, NDL). The first processor (MLI) is also designated as the master processor while the second (NDL) is designated as the slave processor. The master processor together with a master memory control card forms the master controller while the slave processor together with a slave memory control card forms the slave controller. The master controller handles overall data communications to and from the main host system and the Line Support Processors. However, the master processor-controller is generally oriented to handle communications to and from the main host computer, while the slave processor-controller is oriented to handle communications to and from the Line Support Processors which handle the remote data terminals, but it does this through the master processor-controller which uses an Interface Circuit for this purpose.

BRIEF DESCRIPTION OF THE DRAWINGS

FIG. 1A is a network block diagram of a data communications network using the Network Support Processor; FIG. 1B is a drawing showing the mechanical arrangement of the Base Connection Module and the slide-in cards which go to make up the Network Support Processor;

FIG. 2 is a block diagram of the card units which make up the Network Support Processor;

FIG. 3 is a block diagram showing the basic elements which constitute the State Machine Processor;

FIG. 4 is a block diagram showing the elements of the memory address logic of the State Machine Processor;

FIG. 5 is a block diagram showing the elements of the data manipulation logic of the State Machine Processor;

FIG. 6 is a block diagram showing the elements of the instruction execution logic for the State Machine Processor;

FIG. 7 is a block diagram showing the external bus connections between the various elements of the Network Support Processor;

FIG. 8 is a block diagram showing the relationship of the Interface Circuit to the State Machine Processor;

FIG. 9 is a block diagram showing the Message Level Interface logic of the Interface Circuit.

FIG. 10 is a block diagram showing the Data Link Interface logic of the Interface Circuit;

FIG. 11 is a block diagram showing the memory control circuit of the Network Support Processor.

FIG. 12 is a block diagram showing the port connections to and from the RAM cards of the shared memory means;

FIG. 14 is a block diagram showing the State Machine Processor in relationship to the Interface Circuit for interrupt operations;

FIG. 15 is a block diagram showing the location of the various memory resources in the elements of the Network Support Processor;

FIG. 16 is a general block diagram showing the message transfer directions between the host computer, the Network Support Processor and the line communications processor in addition to certain firmware packets used in the Network Support Processor;

FIG. 17 is a block diagram of the Network Support Processor indicating certain firmware packets used in the master and the slave processors therein.

GENERAL

Figure 13:
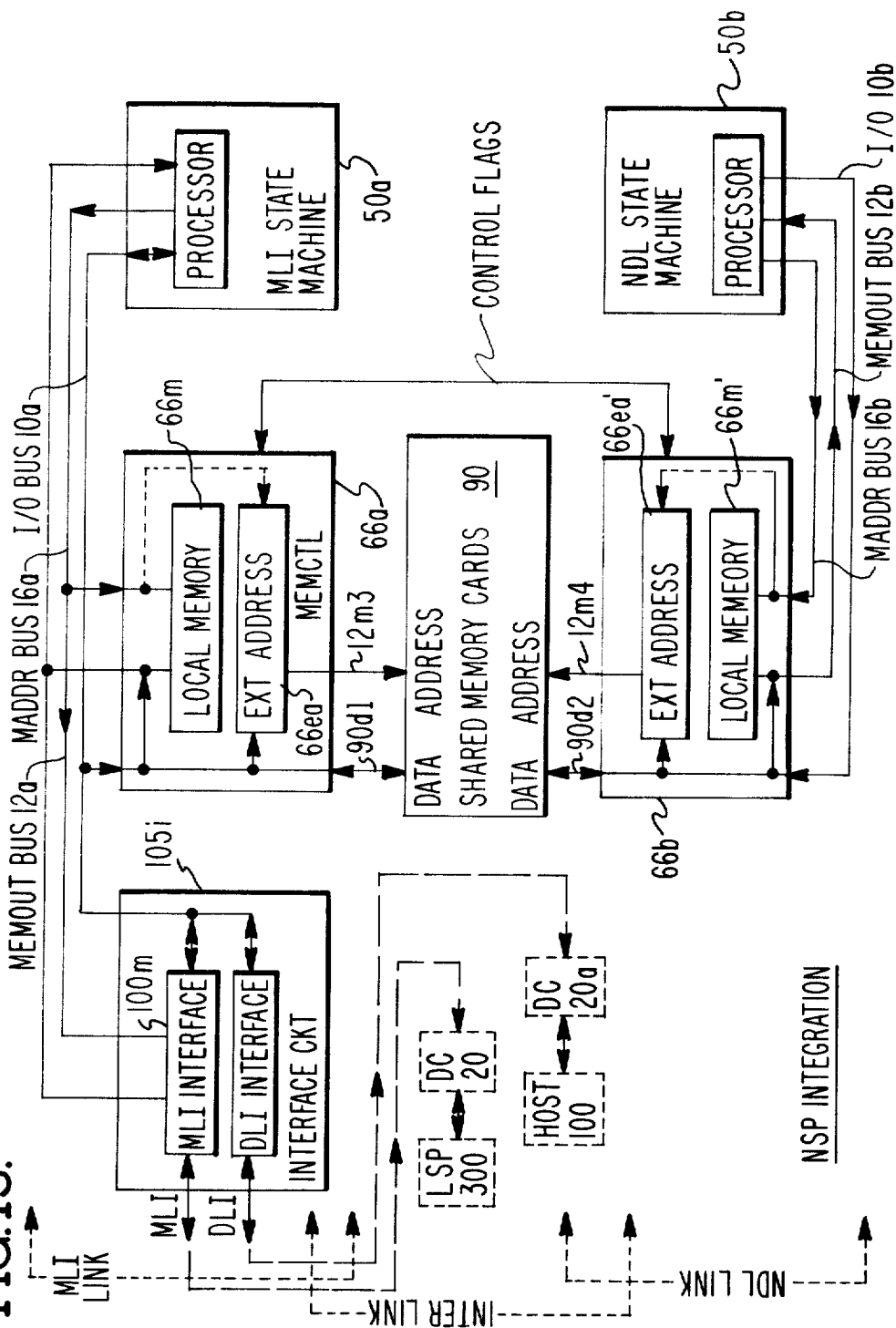
FIG. 13 is a block diagram of the overall Network Support Processor showing the interconnecting bus lines and the links to an external host computer and external line communications processors.

The Network Support Processor, which will herein be designated as NSP, is a dual-processor, 80, FIG. 1A, general purpose, mini-computer which is programmed as a front-end data communications processor. As discussed in the previously referenced patents, certain main host computers have been designed for systems which provide what is known as Message Level Interface (MLI) capability. It is these types of main host computer systems that are compatible with the use of the network support processor and its data communication capabilities. Thus, there is herein involved a data communication subsystem which uses the mentioned message level interface capability and which involves a series of data-comm processors. These data-comm processors are sometimes called data-comm frame-recognition processors and will herein be used with the formal name of Line Support Processor (LSP) on the idea that each of these line support processors provide data communictions and control capability to a series of data communication lines which connect to communication terminals or modems. Any given data communication subsystem is controlled by a network support processor. The operation and use of the Message Level Interface has been discussed in the previously cited patents which have been incorporated by reference into this disclosure.

In this Data-Communications Subsystem, a host computer can support as many as four Network Support Processors (NSPs). Further, each of the Network Support Processors can support as many as four Line Support Processors (LSPs) while each Line Support Processor supports up to 16 line adapters which connect to 16 remote terminals. In this wise, it is seen that a single host computer may then have the capability to control as many as 256 data communication lines. As in FIG. 1A, it will also be seen that a single Network Support Processor can interface with four separate host computers.

Referring to FIG. 1A there is seen an overall diagram of a data communications network. The Network Support Processor 80 has a connection $100_{ix}$ designated as the data link interface (DLI) on one side while the connections $100_{mx}$ on the other side are designated as Message Level Interface (MLI). A series of host computers designated $100_a$, $100_b$, $100_c$ and $100_d$ have connection lines 15 ($15_{a,b,c,d}$) designated as MLI lines each of which connects to a Distribution Card described in the previously cited patents which have been incorporated by reference. A connection module $106_a$ is seen supporting four Distribution Cards disgnated $20_a$, $20_b$, $20_c$ and $20_d$. These Distribution Control Cards (DC) provide for the connection-disconnection function of any host computer system to a specific Network Support Processor and these Distributor Control Cards have been described in the cited patents, and especially is U.S. Pat. No. 4,313,162.

On the other side of the FIG. 1A network, there again is seen a connection module $106_b$ which supports distribution cards of which there is seen a typical Distribution Card DC 20. This Distribution Card 20 provides for controlled connection and disconnection to at least four Line Support Processors designated $300_a$, $300_b$, $300_c$ and $300_d$. Each of the Line Support Processors connects to a block designated "electrical interface" which may consist of up to 16 Line Adapters. The electrical interface units are designated $400_a$, $400_b$, $400_c$ and $400_d$.

As indicated in FIG. 1A, each host computer can be connected with up to four connection modules similar to $106_a$, thus further expanding the connective possibilities of the network.

DESCRIPTION OF PREFERRED EMBODIMENT

As described in the previously cited patents, the main host computer operates on a routine whereby I/O commands are conveyed to a front-end processor for execution after which the front-end processor will return a "result descriptor" word or words to the main computer in order to indicate completion of the task or any exception conditions. The Network Support Processor communicates with the host computer systems at a "message level". This transfer process relieves the host computer of much of the overhead which would be required in supporting a data communications network. The NSP accepts messages from the host system and translates them as required, and uses the proper data communications protocol to ensure that the messages are delivered to the intended data communications device after which it returns a result descriptor word to the host computer.

Should it occur that a message cannot be delivered, the Network Support Processor maintains integrity by ensuring that the message is not lost. This is done by storing the message temporarily and returning an appropriate result descriptor word to the main host computer. Messages which are incoming from the data communications network terminals are edited and translated when necessary, and then the edited messages are placed in a queue after which message delivery is initiated when the host computer indicates a request for delivery of messages.

Referring to FIG. 1B, the hardware orientation of the Network Support Processor is shown as consisting of nine to twelve cards. A base module unit 106 is seen housing facilities for slide-in connector cards. At one end is seen a Distribution Card DC 20 and at the opposite end is a maintenance card $20_m$ whose function has been described in the previously cited patents. The Network support Processor 80 will be seen, in its dual-processor aspect, to consist of a processor $50_a$ designated as the MLI state machine and a second processor $50_b$ designated as the NDL (network definition language) state machine. Each of these processors have a memory control card designated as $66_a$ and $66_b$. The MLI state machine processor $50_a$ connects to an Interface Circuit $105_i$ which has a foreplane cable $105_p$ which connects the Message Level Interface to the Line Support Processor 300. Connections to and from the host system are managed through the backplane of the base module 106 and through the Distribution Card 20. A series of RAM circuit cards provides for "shared memory" facilities and are designated as the elements 90.

Thus, the Network Support Processor in its hardware arrangment involves two processor cards each of which is referred to as a Universal Input/Output State Machine (UIOSM). Each of these processors has a separate memory control card (MEMCTL) designated as $66_a$ and $66_b$. Then the Interface card $105_i$ (FIG. 1B) provides an external data link interface and a Message Level Interface (DLI/MLI). In addition there are the four to seven RAM cards 90 which provide the shared memory.

FIG. 2 shows a block diagram of the Network Support Processor. The state machine cards $50_a$ and $50_b$ are identical cards but are designated as the MLI state machine (master processor) and the NDL state machine (slave processor). The only difference between the two processor cards are the programs in PROM and the jumpers involved. Each of the processor cards has a 16-bit processor element having as much as 32K bytes of PROM in addition to various control registers.

The master processor or MLI state machine $50_a$ (FIG. 2) together with its associated micro-code is responsible for communication with the host computer through the Interface Card $105_i$. The master processor $50_a$ communicates with the slave processor $50_b$ (NDL state machine) through the shared memory 90 and a control line $66_i$.

The slave processor $50_b$ (NDL state machine) and its micro-code is the source of all the NSP messages exchanged with the host computer 100. Also general programs necessary for interfacing to a Line Support Processor 300 are executed by the NDL state machine. Each memory control (MEMCTL) card $66_a$ and $66_b$ includes 16K bytes of "local" RAM memory. However, only the processor assoicated with the particular memory card has access to that local memory. The memory control card (whether $66_a$ or $66_b$) also has logic circuits that permit its associated processor to gain access to the shared memory 90 on the RAM cards of FIG. 1B. Logic provided on the MLI memory control card $66_a$ acts to resolve any processor memory access conflicts as seen in the Module Select Logic of FIG. 11. This card also has a programmable rate generator and an interval timer.

The shared memory 90 in FIG. 2 is composed of RAM cards, each of which has 32K bytes. This memory is shared by the two (master and slave) processors on the State Machine cards $50_a$ and $50_b$. Access to "shared memory" 90 is controlled by the memory control cards $66_a$ and $66_b$.

The Interface Circuit $105_i$ (which is later described in conjunction with FIG. 8) has the logic which is used to interface between a host computer 100 and the Line Support Processors (LSPs) 300. The Interface Card $105_i$ has one part called DLI or data link interface for a synchronous interchange between a Distribution Card 20 $_{a,b,c,d}$ and the host computer 100. The Interface Card $105_i$ also has a foreplane connection designated Message Level Interface through which it connects for a synchronous communication to a Distribution Card, such as 20 and also the Line Support Processor 300. In addition to these external interfaces, the Interface Card $105_i$ includes logic circuits for unit clearing, for interrupt request handling, and for master clock control (8 megahertz) for the entire Network Support Processor.

Each processor of the dual-processors of the NSP 80 communicates through 3 buses as will be seen in FIG. 3. These are the I/O bus 10, the memory address bus 16 (MADDR), and the memory data bus 12 (MEMOUT).

The I/O bus 10 carries data to be written into the main memory of the host computer or transferred between registers of the master and slave State Machine processor ($50_a$, $50_b$) or between registers on the memory control cards $66_a$, $66_b$, and the Interface Card $105_i$. The MEMOUT bus 12 transfers information which is read from memory (shared memory 90). This information could be executable instructions, or memory operands, or data. The memory address bus MADDR 16 points to the current memory word that is to be written or read.

As was seen in FIG. 2, the dual master-slave processor system of the NSP consists of two sections, a MLI processing section and an NDL processing section.

MLI PROCESSING SECTION

Referring to FIG. 2, the MLI processing section of NSP 80 consists of the master processor $50_a$ (MLI state machine), the MLI memory control unit $66_a$ which connects to the interface circuit $105_i$.

The processor is driven by PROM in addition to RAM which is located on the memory control $66_a$ and from instructions in the shared memory 90 (FIGS. 2, 12). The MLI state machine master processor $50_a$ determines the type of host data transfer to be accomplished and also controls the Line Support Processor data transfer through the MLI port $105_p$ (FIG. 1B) the Interface Card $105_i$. The MLI processing section of the NSP communicates with the slave processor $50_b$ (NDL state machine) through the shared memory 90. The Interface Card $105_i$ has a PROM that permits this card to interface the MLI state machine to the host computer 100 at a high level mode. The Interface Card $105_i$ handles the details of the actual data transfer.

NDL PROCESSING SECTION

As seen in FIG. 2 the NDL processing section consists of the slave processor $50_b$ (NDL state machine) which is driven by instructions from local memory ($66_n$, FIG. 15) located on the NDL memory control card $66_b$ or which is driven by data from the shared RAM memory 90. The State Machine PROM (program memory) has a boot strap that loads program information from the host computer over the Local memory (in the memory control $66_b$) and to Shared RAM 90, when the Network Support Processor is initialized. This program then drives the NDL state machine $50_b$ (slave processor).

The NDL processing section provides instructions for communication with the Line Support Processor 300. Communication is done through shared memory 90 and the Interface Card $105_i$ all under the control of the MLI state machine $50_a$. Data transfers to and from the Line Support Processor 300 are controlled by a direct memory access (DMA) logic circuit located on the Interface Card $105_i$ (also see FIG. 7 and discussion thereof). This DMA logic circuit is operated under the control of the MLI state machine $50_a$.

When the MLI state machine $50_a$ has a block of data for the LSP 300, the data is placed in Shared Memory 90. The NDL state machine $50_b$ notifies the MLI state machine $50_a$ by means of an interrupt signal that the LSP is available. The MLI $50_a$ state machine then directs the Interface Circuit $105_i$ to transfer the data from Shared Memory 90 over to the LSP 300 via the message level interface channel 105p. Similarly, when the Line Support Processor 300 has data destined for the NDL state machine 50b, the data is also placed in Shared Memory 90 under the control of the MLI state machine 50a. The MLI state machine 50a then signals the NDL state machine 50b by means of interrupt signals that the Line Support Processor data is now available.

MEMORY FOR NETWORK SUPPORT PROCESSOR

The Network Support Processor 80 (NSP) includes two basic types of memory which are: programmable read only memory (PROM) and random access memory (RAM). In the preferred embodiment of the Network Support Processor, the PROM configuration of the MLI state machine is made to hold 8K bytes while the NDL state machine is made to hold 2K bytes. The PROM is accessible only to the processor state machine in which it is located.

Each of the memory control units 66a and 66b (FIG. 2) will have 16K bytes of local RAM that is accessible only to its associated state machine processor. On the other hand, the Shared RAM Memory 90 is available to either of the two processor state machines, 50a, 50i b.

During a memory access operation, the clock (8 megahertz) period is delayed in order to produce the appropriate memory timing. All memory Write operations require three clock periods. All PROM and Local Memory Read operations require one clock period while a Shared Memory Read operation reuires two clock periods.

UNIVERSAL INPUT/OUTPUT STATE MACHINE PROCESSOR

As seen in FIG. 3 the major functional elements of the Universal Input/Output state machine card is shown. Both the master processor state machine and the slave processor state machine cards are logically identical except for internal programs in the prom 50. Each card has processing logic circuits that control the sequence of operations for the Network Support Processor. The processing circuits consits of memory addressing logic 41, program memory PROM 50, data manipulation logic 32, 33, 34, instruction execution logic 23 and external bus logic 60L. The processing logic interfaces the state machine to other circuits in the Network Support Processor. While these functions are described in U.S. Pat. Nos. 4,292,667; 4,290,106; 4,301,505; 4,291,372; 4,293,909, a brief summary of these elements will follow hereinunder.

MEMORY ADDRESSING LOGIC

The processor state machine memory addressing circuitry is shown in FIG. 4. The addressing logic is made of a Program Counter (PC) 41', a Memory Reference Register (MRR) 40, a Stack Memory 45, a Repeat Counter 42. The PC 41' and MRR 40 are used as the memory address pointers.

The PC 41' points to the current instruction or to the operand for that instruction. As each instruction is executed, the PC 41' automatically increments and then points to the next instruction. The instruction can either reside in the state machine PROM 50, or in Local Memory 66m of FIG. 7, or Shared Memory 90.

The memory reference register (MRR) 40 is used to store the address of the next operand when the operand address cannot be stored at PC+1 (incremented program counter 41'). For instance, when the program must examine the contents of a word of data, the MRR 40 is loaded with the address of the data word. This allows any of the various state machine instructions to be executed while using this data word as the operand.

Repeat Counter 42 is a register that can cause an operation to be repeated up to 256 times. The Repeat Counter 42 is loaded with a value of zero through 255 and is decremented with each repeated operation. When the Repeat Counter underflows (has a value less than zero) then the repeat operation is terminated and the next instruction is fetched. The address source of the memory operand (which is the MRR 40 or the PC 41') is automatically incremented with each execution of the repeated operation. The Stack Memory 45 is used to retain the current program address when a subroutine is called for, and then used to restore that address when the subroutine is terminated with a "RETURN" instruction. The Stack Memory 45 can retain as many as 16 addresses which permit storage of 16 nested subroutines.

PROM

The PROM 50, as used on the processor state machine, is, in the preferred embodiment, an 8K byte storage element. Use of PROM 50 as described in U.S. Pat. No. 4,301,505, at columns 7 through 10.

DATA MANIPULATION LOGIC

In FIG. 5 there is seen a block diagram of the data manipulation logic of the UIO state machine processor. This data manipulation logic is made of 16 general purpose accumulators (designated as element 30) an operand register 31, an arithmetic logic unit (ALU) 32, a byte-swap circuit 34 and a shift logic circuit 33. The 16-bit registers of the accumulators of accumulator 30 are used to store information for manipulation and also to retain the results of the various operations. Reference may be made to U.S. Pat. No. 4,301,505, at columns 8 through 10.

The operand register 31 holds the operand of the current instruction. The ALU 32 receives data from the operand register 31 and the accumulator 30. A variety of logical and arithmetic operations are then performed on the data, as has been mentioned in the previously cited reference patents. The ALU 32 provides output to the byte-swap logic circuit 34 and the shift logic circuit 33.

The byte-swap logic output is used to replace the sequential order of the byte sequence provided by the ALU 32. In byte-swapping, the most significant byte of the ALU output is exchanged with the least significant byte, and similarly the least significant byte is exchanged with the most significant byte in sequential order.

The shift logic circuitry 33 can be used to shift or to rotate the ALU output to the left or to the right. Also, the shift logic circuitry can also transfer the ALU output directly and without alteration.

INSTRUCTION EXECUTION LOGIC

In FIG. 6 there is seen a block diagram of the instruction execution logic of the UIO state machine processor. The instruction execution logic circuitry is made of an instruction register 22, an instruction decoder set of PROMS and latching registers for the output of the PROMS at element 23c. The instruction register 22 holds the current state machine instruction. This current instruction is received from the PROM 50, in the state machine, or from either local $66_m$ or shared memory 90. The instruction decode PROMS $23_c$ are addressed by the instruction register 22. The PROMS $23_c$ decode the instructions into 40 different control signals that control the operation of the state machine processor (such as chip enable, counting controls, etc.). The output of the decoder PROMS $23_c$ is latched by registers when required for timing or for signal stability.

EXTERNAL BUS LOGIC

Referring to FIG. 7, the major external buses of the State Machine Processor $50_a$ are seen connected to the Interface Card $105_i$ and the memory control card 66. These buses going external to the State Machine $50_a$ are the I/O bus 10, the memory address bus (MADDR 16), the memory data-out bus (MEMOUT) 12 and the Put/-Get Enable line $60_{pg}$.

As seen in FIG. 7, the memory address bus 16 and the I/O bus 10 also connect to the memory control card 66 which holds its own Local Memory $66_m$. Also, the memory data-out bus 12 can receive data from the memory control card 66 along the bus extension 12'. The memory control card 66 has a data bus 12" and also an address bus 16" which connects to the Shared Memory 90. The I/O bus 10 and 10' is used to transfer information to Local Memory $66_m$ and to the Shared Memory 90. I/O bus 10 is also used to bring instructions and data back into the State Machine Processor $50_a$.

The memory address for the MADDR bus 16 is generated on either (a) the State Machine Processor $50_a$ or else (b) the Interface Card $105_i$. The State Machine addresses either the Local Memory $66_m$, the Shared Memory 90 or the PROM 50 (FIG. 4). The Interface Card addresses Local or Shared Memory during direct memory access (DMA) only. In the previously cited patents, which involved the Universal I/O State Machine Processor and which patents have been heretofore cited and incorporated by reference, it will be seen in FIG. 2B of U.S. Pat. No. 4,301,505 there was described two control registers 37, 38. These are called application control registers and are used to store information for logic which is external to the State Machine Processor $50_a$. These application control registers are unique in that the registers receive data which is generated on the State Machine Processor $50_a$, but the data in the control registers is clocked by signals that are generated on cards other than the State Machine $50_a$.

In FIG. 7 the Interface Card $105_i$ will be seen having a data link interface (DLI) to the host computer 100 and also a message level interface (MLI) to the Line Support Processor 300. In addition, the Interface Card has an interrupt line and an interrupt acknowledge line between itself and the State Machine Processor. The memory control card 66 also has a control line $66_i$ for interchange of signals between the NDL processor $50_b$ and master MLI processor $50_a$.

INTERFACE CARD

The major elements of the Interface Card $105_i$ are shown in the block diagram of FIG. 8. The Distribution Card $20_a$ connects, via the data link interface (DLI), to the Data Link Interface logic $100_i$.

The Distribution Card 20 connects to the MLI logic $100_m$ via the bus $105_p$. The MLI memory control card $66_a$ connects to the message level interface logic $100_m$ by means of buses 16 and 12. The message level interface (MLI) State Machine Processor $50_a$ connects via the frontplane I/0 bus 10, to the DLI logic $100_i$, to the PROM sequencer $100_{ps}$ and to the MLI logic $100_m$.

The Interface Card $105_i$ furnishes a data link interface (FIG. 7) between the host computer system 100 and the Network Support Processor; and it also furnishes a message level interface (FIG. 7) between the Network Support Processor and the Line Support Processor (LSP) that it controls. In summary FIGS. 8, 9, 10 show the Interface Circuit has an MLI section $100_m$, a DLI section $100_i$ and a PROM sequencer $100_{ps}$. As was seen in FIG. 1B, the Interface Card communicates with the other NSP circuitry through foreplane connectors.

MESSAGE LEVEL INTERFACE LOGIC $100_m$:

Data transfers between the Network Support Processor (NSP) 80 and any individual Line Support Processor (LSP) 300 are performed by means of a standard MLI logic circuit $100_m$ on the Interface Circuit $105_i$. This will be seen in FIGS. 7, 8 and 9. The data transfers performed may be in either a DMA mode, a non-DMA mode.

In the DMA mode, a DMA address counter 160 (FIG. 9) is initialized by the MLI state machine $50_a$ as a "pointer" to the first word in memory to be transferred. At the same time a transfer counter $160_{tc}$ is initialized by the State Machine Processor $50_a$ together with the complement of the number of words to be transferred. DMA logic (FIG. 9) then handles the data transfer without further intervention by the State Machine Processor $50_a$. As each word is transferred, the DMA address counter 160 is incremented and the DMA "transfer counter" $160_{tc}$ is decremented. The DMA operation is then normally completed when the DMA "transfer counter" overflows, that is to say, when the value is "0". The DMA logic also terminates DMA mode when an abnormal condition, such as a DMA time-out or an unexpected LASP status signal, is detected.

All direct memory access operations (DMA) are initialized by the MLI State Machine Processor $50_a$ and are controlled by a DMA control PROM. During DMA operations, the clock to the State Machine Processor is inhibited and the state machine PUT register, the Get register, and the I/O bus are disabled.

NON-DMA MODE

In the non-DMA mode, data is transferred word-by-word, to the Line Support Processor (LSP) 300 (specifically to the selected LSP $300_a$, $300_b$, $300_c$ or $300_d$). In this non-DMA mode, the data transfers are performed under the direct control of the MLI State Machine Processor $50_a$. Data is transferred from the I/0 bus 10 to a data holding register 60 (FIG. 9) and then via the transmitter-driver $60_{tx}$ (FIG. 9) to the connection module $106_b$ to the the LSP 300.

The message level interface logic circuit $100_m$ is shown in a block diagram of FIG. 9. The DMA register 120 receives data along the foreplane memory bus after which it is conveyed to transmitter TX and thence to receiver RX over to the State Machine Processor Card $50_a$. The Line Support Processor 300 connects via the DLI to a connection module $106_b$ and to the electrical interface EI (line adapter) through the MLI logic lines to the receiver RX. The State Machine Processor $50_a$ connects via I/0 bus 10 to the DMA address register 160 and the holding data-register 60. The output of address register 160 is conveyed via memory address bus 16 over to the memory control card $66_a$ and to the State Machine $50_a$.

DATA LINK INTERFACE LOGIC CIRCUIT (DLI)

FIG. 10 is a block diagram of the data link interface logic circuitry originally shown in FIG. 8 as circuit $100_i$. This data link interface logic circuit is the DLI circuit associated with the MLI State Machine Processor $50_a$ of FIG. 8. In FIG. 10 there is seen a first-in-first-out (FIFO) stack register $100_{i3}$. This is a 64-word register, each word of which is 16-bits. This register holds data to be transferred to the host computer 100 or else it also holds data which is received from the host computer. The tri-state driver-receiver circuit $100_{i1}$ sends and receives data to or from computer 100 via the backplane. It also receives data on the internal data bus. Another source of data is memory control card $66_a$ which has foreplane connections to the tri-state driver-receiver $100_{i5}$. The tri-state driver-receiver $100_{i5}$ connects via an internal data bus to a holding register $100_{i2}$ which provides an input to the stack register $100_{i3}$. The output of the stack register $100_{i3}$ is fed to an inverter $100_{i4}$ which provides an output to both tri-state driver-receivers $100_{i5}$ and $100_{i1}$.

PROM SEQUENCER

The PROM sequencer $100_{ps}$ is shown as part of the DLI Logic Circuit of FIG. 8. This PROM sequencer is designed to relieve the State Machine Processor $50_a$ from the overhead operations required to perform standard DLI operations which are directed to the host computer system. The logic circuitry in the PROM sequencer is designed to provide and adhere to the standard MLI protocol for host system data transfers. The PROM sequencer receives a starting PROM address from a Start Address register which is initialized by the master State Machine Processor $50_a$. The PROM sequencer then steps through a series of control states to provide control signals which perform the required data transfer operation. Sequencing continues until the PROM sequencer has completed the assigned tasks or until an unexpected condition is detected. The State Machine Processor is notified of the unexpected condition by means of an interrupt signal and a status register signal. The status register defines the cause of the interrupt.

MEMORY CONTROL CARD (MEMCTL)

As previously discussed with respect to FIG. 2, the Network Support Processor 80 holds the memory control cards $66_a$ and $66_b$; and each of these control cards is respectively associated with the master $50_a$ and slave $50_b$ State Machine ($50_a$, $50_b$) Processors within the Network Support Processor. A block diagram of the basic elements of the memory control card 66 is shown in FIG. 11.

As seen in FIG. 11, the memory control card 66 provides a Local Memory of 8K words. This Local Memory is for exclusive use by its associated State Machine Processor, that is, to say, memory control card $66_a$ is for exclusive use of the MLI processor $50_a$, while the memory control card $66_b$ is exclusively for use of the NDL processor $50_b$. The memory control card 66, in FIG. 7, is the generalized layout for the memory control and it also includes logic circuitry that allows the particular state machine processor to address up to 132K words of Shared Memory 90. The actual Shared Memory that is allowed in the Network Support Processor 80 is limited to 115K words by the constraints of the NSP software. Communications with other cards in the Network Support Processor is conducted via the foreplane connectors shown in FIG. 1B.

The use of maintenance card signals (PRIF, DSIM, MAINT. SEL) shown in FIG. 11, have been discussed in the cited reference patents which have been included herein by reference.

As seen in FIG. 11, the memory control cards in each case are the same except that the MLI memory control card $66_a$ has an added module select logic circuit shown surrounded by the broken line.

The module select logic shown within the dotted line of the memory control card ($66_a$) only is necessary because one of the state machine cards is the master processor ($50_a$) while the other state machine, the NDL processor $50_b$, is the slave processor. Thus, the module select logic differentiates the master processor card from the slave processor card and selects when each card will be able to use the Shared Memory 90, should both $50_a$ and $50_b$ simultaneously attempt to access the same memory address in shared memory 90.

The memory address bus 16 from the State Machine Processor $50_a$ carries address data to arithmetic logic unit $66_u$ and to the Local Memory $66_m$ and also to an address select register $66_s$ which has an output conveyed to the Base Address Register $66_r$, whose data output is fed to the ALU $66_u$. The ALU $66_u$ provides a combined memory address which is sent to Shared Memory 90 for access. Simulated test signals from the maintenance card $20_m$ (FIG. 1B) may also be gated into the ALU $66_u$ and the Local Memory $66_m$.

The I/0 bus 10 can convey data into the Base Address Register $66_r$, to the Local Memory $66_m$ and to the data bus $10_{db}$.

LOCAL MEMORY

The Local Memory $66_m$ (FIG. 11) of the memory control card 66 provides 8,192 17-bit words of RAM for the particular state machine processor associated with that card. This RAM memory receives address information from the memory address bus 16 and also input data from the I/0 bus 10. The data output from the local memory $66_m$ is through the common memory data-out bus, MEMOUT 12.

SHARED MEMORY CONTROL

The Shared Memory "control" section of the memory control card 66 has circuits which permit the expansion of the addressing capability of the state machine processor to 131K words. Logic circuits consist of a MAP generator PROM (not shown) and 16 base address registers (BAR) $66_r$ and a 17-bit arithmetic logic unit (ALU) $66_u$.

The MAP generator is a 32-by-8 PROM that decodes the most significant 4-bits of the memory address on bus 16. This decoding determines whether or not the Shared Memory 90 is to be addressed.

The Base Address Register (BAR) $66_r$ is evenly divided into two groups of 8 BARs. Thus there are 16 of these base address registers. One group of these (BAR0–BAR7) is used when the Shared Memory 90 is being addressed by the state machine program counter 41'. The other group of Base Address Registers (BAR-8–BAR15) is used when the Shared Memory is being addressed by the memory reference register (MRR) 40 (FIG. 4) of the state machine processor.

Any one of the Base Address Registers $66_r$ are loaded through the I/0 foreplane bus 10 by the software and they point to a base address that encompasses a 4K area in Shared Memory 90. A Base Address Register output to the ALU $66_u$ is selected by decoding the state machine memory address bus control line 16. This decoding selects one group of 8 Base Address Registers. By decoding the three high-order memory addresses (14:03), one of the 8 Base Address Registers in that particular group is selected.

ARITHMETIC LOGIC UNIT (ALU)

The ALU $66_u$ of the memory control card 66 as FIG. 11 is a 17-bit adder. The A-inputs are derived from a Base Address Register and the B-inputs are derived from the memory bus 16. The data outputs are applied to the Shared Memory address bus (XMADR). The 16-bit Base Address Registers will furnish 14-bits (15:14) to bit positions 16:14 of the arithmetic logic unit A-input. Bit positions 0 and 1 are grounded. The 16-bit memory address bus (MADDR) 16 furnishes 12-bits (11:12) to bit positions 11:12 of the arithmetic logic unit B-input. The bit positions 16:05 are grounded. The ALU output, which is the sum of the most significant 14-bits of a selected Base Address Register and the least significant 12-bits of the memory address bus 16, is a 17-bit Shared Memory address XMADR that selects one of 115K words.

MEMORY CONTROL WAIT LOGIC

Under certain conditions, the memory control cards 66 will generate a WAIT signal that stop the associated state machine clock connected with that memory control card. This clock is stopped as long as the WAIT signal is "active". One of the WAIT conditions occurs when the memory control card 66 is writing into, or reading from, the Shared Memory 90. The memory control card will insert the appropriate WAIT signal to provide the appropriate delay since the Shared Memory may be too slow to keep up with the faster action of the State Machine Processor and the memory control card.

Another condition occurs when both of the memory control cards $66_a$ and $66_b$, attempt a simultaneous access to the same Shared Memory card 90. A priority generator (PRIGEN) PROM, or the MLI memory control card $66_a$ will resolve the contention and cause the appropriate WAIT states to be generated.

A third condition occurs when the State Machine Processor detects a memory parity error. A WAIT signal resulting from a memory parity error is "ungated", that is, to say, it is not passed through. The WAIT signal causes the state machine clock to remain stopped until the state machine is clear.

RAM CARDS

As seen in FIG. 12 a schematic diagram is shown of the shared memory RAM circuitry designated as 90 on FIG. 1B.

Each of the cards has a 32KB capacity for use as contribution to the Shared Memory 90. The entire memory capacity of RAM 90 is shared by the 2 State Machines $50_a$ (MLI) and $50_b$ (NDL). As seen in FIG. 1B, this capacity may be provided by anywhere from 4 to 7 RAM cards.

One particular unit of the Shared Memory RAM cards is unique in that it has termination resistors for the Shared Memory address lines and for the memory-out (MEMOUT) bus. This particular card is called a RAM termination card and designated 32KB RAM TER. The termination RAM card must be located at the end of the memory buses in the Network Support Processor.

The RAM card contains 68 4096by-1 RAM chips. Each card has one data and one addressing port (FIG. 12) connected to the MLI memory control card $66_a$. A second data and addressing port on the RAM card is connected to the NDL memory control card $66_b$. This allows the Shared Memory to be accessed by either the master $50_a$ or slave $50_b$ State Machine Processor. Communication with the memory control cards is done through a foreplane connector.

As seen in FIG. 12 the addresses from the memory control cards of the MLI state machine and the NDL state machine, respectively enter the B port $90_{ab}$ and the A port $90_{aa}$ and are thence connected to the address input of a RAM card such as $90_1$. The data from the first and second State Machine (master $50_a$ and slave $50_b$) on the incoming data phase, are conveyed to ports $B_{d1}$ and $A_{d1}$ from which they are conveyed to data input, DI, at the data input of card $90_1$. The data ouput, DO, of the RAM card $90_1$ is fed into port $B_{d2}$ and $A_{d2}$ from whence they are respectively conveyed on the data lines to the MLI state machine memory control $66_a$ and NDL state machine memory control $66_b$.

FUNCTIONAL ASPECTS OF THE NETWORK SUPPORT PROCESSOR

Integration of the various functions of the Network Support Processor is accomplished through the use of buses and consists of three basic links as will be seen in FIG. 13. These links consists of the MLI link, the NDL link, and the INTER link. These links make it possible for the combination of cards, which constitute the Network Support Processor, to work in an intergrated fashion as a total unit.

The Network Support Processor (NSP) 80 is essentially a multi-unit-computer. One processor (designated as the MLI processor-controller) consists of a MLI state machine card $50_a$, a MLI memory control card $66_a$. and an Interface Card $105_a$, as indicated in FIG. 2.

The second unit (designated as the NDL processor controller $50_b$) consists of the NDL state machine card $50_b$ and the NDL memory control card $66_b$. Both of these processors-controllers are structured in the same manner and both can access Shared Memory 90.

The three primary buses that carry information and addresses among the various cards (FIG. 13) are the I/0 bus 10, the Memory Address (MADDR) bus 16 and the memory data-out bus (MEMOUT) 12. Further, additional control information is passed among the cards of each controller by means of the foreplane connectors (shown in FIG. 1B).

As seen in FIG. 13, the MLI link connects the three cards ($105_i$, $66_a$, $50_a$) of the MLI processor controller. It also provides connection between the MLI controller and the Shared Memory 90. The NDL link connects cards $66_b$ and $50_b$. The INTER link connects Shared Memory 90 to $66_a$ and $66_b$.

INPUT/OUTPUT (I/0 BUS

The I/0 bus $10_a$ is a common data bus that connects the three cards of the MLI controller. The information on this bus involves the following:

(a) control information from the MLI state machine $50_a$ to the Interface Card, $105_i$.
(b) control information from the state machine $50_a$ to MLI memory control card, $66_a$.

(c) status information from the Interface Card to the state machine.

(d) data received from the host computer 100 on the DLI which is stored in the interface FIFO register (FIG. 10) and then sent to either the state machine or to Memory 90.

(e) data from either the state machine or memory is sent to the Interface Card 105$_i$ for storing in FIFO register for subsequent transmission to the host computer over the DLI.

(f) data received from the LSP 300 on the MLI and sent to either the state machine, or to Memory 90 in a non-DMA mode, or to Memory 90 in a DMA mode.

(g) data from either the State Machine 50$_a$ or from Memory 90 which is sent to the Interface Card 105$_i$ in the non-DMA mode for transmission to the Line Support Processor 300 on the MLI.

(h) data from the State Machine 50$_a$ to be written in Local 66$_m$ or into Shared Memory 90.

MEMORY ADDRESS (MADDR) BUS

The Memory Address Bus 16$_a$ (FIG. 13) is a common address bus that connects the three controller cards for the MLI controller which consists of cards 50$_a$, 66$_a$ and 105$_i$. The following information is conveyed on the Memory Address Bus 16$_a$:

(a) The program counter 41' outputs (or the memory reference register 40 outputs) of the State Machine when addressing: PROM circuitry on the State Machine 50$_a$, or Local Memory 66$_m$ on the memory control card 66$_a$.

(b) The DMA address register (FIG. 9) on the Interface Card 105$_i$ which is used for addressing Local Memory 66$_m$ on the memory control card (MEMCTL) 66.

(c) The program counter 41' output, the State Machine MRR 40 output, or the DMA address register 160 on the MLI interface (FIG. 9) for addressing the Base Address Register (BAR 66$_r$) and for addressing the module select logic (FIG. 11) on the memory control card 66$_a$ in order to address Shared Memory 90. The module select logic on FIG. 11 is used to determine whether card 50$_a$ or 50$_b$ will get access to Memory 90 in any given period.

The Memory Address Bus 16$_b$ is used as a common address bus that connects the NDL controller (state machine cards 50$_b$ and memory control 66$_b$). Here the following information data is transferred on the memory address bus (FIG. 13):

(a) The program 41' output (or the MRR 40 output) of the NDL state machine 50$_b$-outputs which are used for addressing the NDL PROM 50 or for addressing Local Memory 66$_m$ on the memory control card 66$_b$.

(b) The program counter 41' output (or the MRR 40 output) of the NDL state machine which transfers information to the Base Address Register, BAR 66$_r$ (FIG. 11) and the logic on the memory control card 66$_b$ in order to address Shared Memory 90.

MEMORY OUTPUT BUS (MEMOUT)

The Memory Output Bus 12$_a$ is a common data bus that connects the three cards (50$_a$, 66$_a$, 105$_i$) of the MLI controller. Information on this bus consists of the following:

(a) The output of the Local Memory 66$_m$ on the memory control card 66$_a$ to either the state machine 50$_a$ (for program information or data) or to the DMA register 66$m$ (FIG. 9) on the Interface Card 105$_i$ for transmission of data to the Line Support Processors (LSPs) over the message level interface.

(b) The output of Shared Memory 90 over to the state machine 50$_a$ or to the Interface Card 105$_i$ and LSP 300.

(c) The output of Local Memory 66$_m$ on the memory control card 66$a$ which transfers either program information or data to the MLI state machine, 50$_a$.

(d) The output of the Shared Memory 90 which transfers information to the NDL state machine, 50$_b$.

Likewise, MEMOUT bus 12$_b$ provides similar functions for the NDL state machine 50$_b$ (FIG. 13).

SHARED MEMORY INTERFACE

The MLI memory control card 66$_a$ sums the memory address (MADDR) together with the output of a Base Address Register (BAR) in order to generate a Shared Memory address for use to select a Shared Memory word in Memory 90. This MEMCTL card 66$_a$ also handles a bi-directional shared memory data bus 10$_a$ that transfers write-data over to Shared Memory 90 and returns read-data from the Shared Memory 90. Write-data is provided by the I/O bus 10$_a$ of the MLI link. Read-data is transferred through an isolator on the memory out bus 12$_a$ of the MLI link, FIG. 13.

The NDL memory control card 66$_b$ sums the memory address together with the output of a Base Address Register (BAR) which is loaded to generate a shared-memory address that selects a memory word from Memory 90. The memory control card 66$_b$ also handles a bi-directional shared memory data bus that transfers Write data over to Shared Memory 90 and returns Read data from Shared Memory 90. Write-data is provided by the I/O bus 10$_b$ of the NDL Link. Read-data is transferred through an isolator on to the memory out bus 12$_b$ of the NDL Link.

NDL LINK

The NDL Link shown in FIG. 13 connects the two cards of the NDL controller which consist of 50$_b$ and 66$_b$. This Link also provides a connection between the NDL controller and the Shared Memory 90.

NSP INTERLINK

The only "data" communication between the MLI cntroller (cards 50$_a$, 66$_a$) and the NDL controller (cards 50$_b$ and 66$_b$) is through the Shared Memory 90.

The MLI controller communicates with Shared Memory 90 through a shared memory interface within the MLI Link. The MLI Link, illustrated in FIG. 13, connects the 50$_a$, 66$_a$ of the MLI controller to interface unit 105; and also connects the controller with the Shared Memory 90. Similarly, the NDL controller communicates with Shared Memory 90. Each RAM card (FIG. 12), in Shared Memory 90, has a separate port and its own port selection logic circuits for each of two (MLI and NDL) shared memory interfaces.

The port selection logic, FIG. 12, is controlled by signals generated on the MLI memory control card 66$_a$. Control flags (FIG. 13) are passed between the two memory control cards 66$_a$ and 66$_b$ in order to control access to Memory 90. These flags cause the MLI Link port to be selected when the MLI controller requires access to Shared Memory 90. Otherwise, the NDL link port is activated.

The same RAM card 90 cannot be accessed simultaneously by both the MLI controller and the NDL controller. Simultaneous access is prevented by the logic circuits on the MLI memory control card $66_a$. However, two different RAM cards in the Shared Memory 90 can be simultaneously accessed by the MLI and NDL controllers as long as it is not the same RAM card which is trying to be accessed at the same time.

STATE MACHINE EXTERNAL INTERRUPTS

A State Machine Processor, as discussed in FIGS. 3,4,5 and 6, operates in either a "foreground" or "background" mode. Foreground mode is used for normal operations and can be interrupted by a signal from the Interface Card $105_i$. Background mode is used when the State Machine services "external" interrupts. While in background mode, the State Machine cannot be interrupted again until it is first returned to the foreground mode by the program.

The logic circuitry that handles the two modes consists of; 16 accumulators (of which eight accumulators are assigned to each mode); a flag register assigned to each mode; and one MRR-save register 47 that retains the contents of the MRR 40 when the State Machine switches from foreground to background mode. As seen in FIG. 14 the foreground accumulators are indicated as $30_f$ while the background accumulators are $30_b$. The foreground flag register is designated 35 while the background flag register is 36 and the MRR-save register is designated as 47.

When a State Machine, which is operating in the "foreground" mode, detects an interrupt, the status of the State Machine is saved. First, the contents of the program counter PC 41' are saved in the stack memory 45; second, the program counter 41' is loaded with an address furnished by the source of the interrupt (Interface Card $105_i$); third, the foregroud accumulators $30_f$ are disabled and the background accumulators $30_b$ are enabled; fourth, the foreground flag register 35 is disabled, and the background flag register 36 is enabled; and fifth, the MRR 40 data is stored in the MRR-save register 47 (FIG. 14).

Thus, the pre-interrupt-status of the State Machine is stored, without alteration, for future use. The State Machine is then able to perform an interrupt service routine. The State Machine status is restored by reversing the status-save procedure after the interrupt service is completed. The firmware routine that was in process when the external interrupt was detected, resumes execution at the point where the interrupt occurred.

In a Network Support Processor (NSP), only the MLI state machine $50_a$ can be interrupted. The interrupt is generated on the Interface Card $105_i$. An interrupt occurs when the PROM sequencer $100_{ps}$ reaches a point where it requires State Machine assistance in order to determine the next step. This point includes the complete transmission of a message to the host computer 100 and the complete receipt of a message from the host computer.

The Interface Card $105_i$ forces the MLI state machine to the address 0002. This address holds a branch to the interrupt servicing routine. Among the first instructions in this routine are instructions to fetch the contents of the Interface Card status register 200, FIG. 14. This information is used to determine the appropriate response to the interrupt signal.

The two flag registers 35, 36 are 7-bit registers on the State Machine that determine whether to perform conditional branch operations and execute a conditional call or a conditional return; or whether to call a subroutine or to return from a subroutine.

There are two sets of bits in the flag registers. One set of three bits are "external" flags. This set is used to accept data that is external to the card. The second set consists of four bits. This set hold the state of the ALU output after the last arithmetic operation. These bits record whether or not the entire ALU output is zero (the state of the most significant and least significant ALU output bits) and the state of the ALU "carry" output.

The State Machine has a background-foreground control flip-flop $23_m$ (FIG. 14) that selects the operational mode. This flip-flop is automatically set to the foreground mode when the NSP is initiated. It is set to the background mode by an external interrupt. As long as the flip-flop remains in the background mode, no further interrupts are acknowledged. This flip-flop is reset to foreground mode at the conclusion of the interrupt servicing routine. New interrupts are then accepted.

The State Machine acknowledges two program-interrupt instructions:

(1) An instruction for interrupt disable (2) An instruction for interrupt detect enable The instructions do not depend of the existence of external interrupt. Interrupt instructions protect certain areas of the program from external interruption. In FIG. 14 there is shown the NSP interrupt logic where the PROM sequencer $100_{ps}$ is initiated by a start address from a PUT instruction.

MEMORY ADDRESSING

As seen in FIG. 15, a block diagram of the Network Support Processor illustrates the major elements of the NSP 80 indicating the MLI processor controller ($50_a$, $66_a$) and also the NDL processor-controller ($50_b$, $66_b$) each of which connect to a commonly Shared Memory 90.

There are three distinct types of memory in the Network Support Processor as follows:

(a) Each State Machine processor has a PROM that holds part of the State Machine program. In FIG. 15 the NLI State Machine $50_a$ is seen having its 8K PROM $50_m$ for storage of its program; likewise, the NDL State Machine $50_b$ is seen to have its PROM $50_n$ for storage of its program with 2K words.

(b) Each memory control (MEMCTL) card contains part of the State Machine program and also a Local Memory for each of the State Machines. For example, in FIG. 15, the MLI memory control $66_a$ is seen to have a 16K word RAM $66_m$ for its Local Memory; likewise, the NDL memory control $66_b$ has its own Local Memory $66_n$ which includes a 16K RAM; further, each memory control card in FIG. 15 also includes a PROM which contains part of the State Machine program and which is part of the Local Memory $66_m$.

(c) The Memory 90 of FIG. 15 (also seen in FIG. 1B) is a series of RAM cards, each of which has a 32 kilobyte capacity. These RAM cards can hold part of the program for both of the Master and slave State Machines and they provide a Shared Memory 90 which can be accessed by either of the State Machines by means of their associated memory control cards.

The State Machines can have as many as 16K program words in PROM memory. In the preferred embodiment the MLI State Machine 50$_a$ has 8K program words and the NDL State Machine 50$_b$ has 2K words of program. Each memory control card has 8K words of Local Memory available to its associated State Machine. The number of words in Shared Memory 90 will vary with the number of RAM cards installed in the Network Support Processor seen in FIG. 1B. The Shared Memory is addressed by either of the state machines.

As an example of the peferred embodiment seen in FIG. 1B, if there are 4 RAM cards, then the shared memory provides 65,536 words and 131,072 bytes; if there are 5 RAM cards then the shared memory includes 81,920 words and 163,840 bytes; with 6 RAM cards the shared memory is 98,304 words and 196,608 bytes; with 7 RAM cards the shared memory is 114,688 words and 229,376 bytes.

PROM AND LOCAL MEMORY

The PROM memory and Local RAM are divided into blocks of 4K words for addressing purposes. The PROM is divided into 4 addressable blocks: PROM O, PROM 1, PROM 2, PROM 3. Not all of the PROM address blocks are used. Local RAM is divided into two addressable blocks: the RAM 0-4K and RAM 4-8K.

The PROM or the Local RAM is directly addressed by the 16-bits from the memory address MADDR bus 16. The foremost significant bits on the memory address bus (15:4) are used to select a 4K word block. Then a word within that block is selected by the 12 least significant bits (11:12).

SHARED MEMORY ADDRESSING

The 16-bits (on the memory address bus, MADDR 16) address a maximum of 64K words. Since the Network Support Processor 80 has up to 162K words of memory, then a method of expanding the basic address range is required.

In FIG. 11 the memory control card is shown to have a logic circuit (66$_s$, 66$_r$, 66$_u$) for the conversion of the 16-bit memory address into a 17-bit "shared memory" address. This logic circuit consists of 16 Base Address Registers (BAR 66$_r$) and also a 17-bit ALU 66$_u$. A BAR is pre-loaded by software with a base address that is applied to the A-input of the ALU 66$_u$. The least significant 12-bits of the memory address bus 16 are applied to the B-input. The two values are summed together in the ALU in order to provide 17-bit address to Shared Memory 90. Fourteen of Base Address Registers (BAR) are used and can be pre-loaded by software during a base address. The BAR can address all areas of shared memory. This is done, however, with two addressing restrictions:

(a) The base address which is loaded into the BAR must be modulus four since the two least significant BAR inputs to the ALU are forced to be LOW.

(b) The base address must point to a 4K memory block within the constraints of the installed Shared Memory 90.

Since the ALU 66$_u$ is 17-bits wide and the BAR is 16-bits wide, the BAR input to the ALU must be offset by 1-bit. In other words BAR bit 15 is applied to the ALU bit 16. As a result of this offset, the Shared Memory base address is two times the absolute value held in the BAR. The extra bit (bit-0) to the ALU is grounded. Bit-1 from the BAR to the ALU is also grounded in order to prevent timing problems on the shared memory boards.

The Base Address Register (BAR) of the memory control (FIG. 11) is loaded by the means of the I/O bus 10 from the State Machine by a PUT STROBE 1 instruction. As an example of this, the following PUT instruction is illustrative:

PUT XVVV XXOO nnn nnn nnn nnOO

Where:
- the X-bits are "do not care" bits;
- the V-bits are used to select one of the 16 BAR's;
- the n-bits are the data bits which are loaded in the BAR.

A particular Base Address Register BAR (66$_r$) is selected for addressing by a combination of bits (15:04) of the memory address bus 16 and the MRR 40 (FIG. 4) output enable signal. When the memory address is derived from the program counter, PCC 41', the MRR output enable signal (MRROE) is "false" and the bit selection is that of BAR 0 through BAR 7.

When the memory address is derived from the MRR 40 (FIG. 4), the MRR output enable signal is "true" and the bit selection is then BAR 8 through BAR 15. The following Table I indicates the Base Address Register selection as a function of the program counter 41' and memory address bits 15:04.

TABLE I

| Program Counter Addressing | | | | |
|---|---|---|---|---|
| MADDR (15:4) | | | | |
| 15 | 14 | 13 | 12 | BAR Selected |
| 0 | 1 | 1 | 1 | 07 |
| 1 | 0 | 0 | 0 | 00 |
| 1 | 0 | 0 | 1 | 01 |
| 1 | 0 | 1 | 0 | 02 |
| 1 | 0 | 1 | 1 | 03 |
| 1 | 1 | 0 | 0 | 04 |
| 1 | 1 | 0 | 1 | 05 |
| 1 | 1 | 1 | 1 | 07 |

Note:
BAR six is not used.

The following Table II indicates the Base Address Register selection as a function of MRR 40.

TABLE II

| Memory Reference Addressing | | | | |
|---|---|---|---|---|
| MADR | | | | |
| 15 | 14 | 13 | 12 | BAR Selected |
| 0 | 1 | 1 | 1 | 15 |
| 1 | 0 | 0 | 0 | 08 |
| 1 | 0 | 0 | 1 | 09 |
| 1 | 0 | 1 | 0 | 10 |
| 1 | 0 | 1 | 1 | 11 |
| 1 | 1 | 0 | 0 | 12 |
| 1 | 1 | 0 | 1 | 13 |
| 1 | 1 | 1 | 1 | 15 |

Note:
BAR fourteen is not used.

The 17 address bits apply to the Shared Memory 90 are divided into three groups. One group (16:03) is used to select one of eight possible RAM cards. A second group (13:12) is used to select one of the 4K word blocks within the selected page. The third group (01:02) is used to select one of the four pages on the selected card.

PROGRAM ADDRESSING

A program PROM 50, situated on each State Machine, holds the first 16K of memory addresses. However, only that portion of the PROM that includes program information is addressed directly by either the program counter, PC 41', or the memory reference register, MRR 40. As previously noted, the MLI State Machine has 8K words of PROM while the NDL State Machine has 2K words of PROM in the preferred embodiment of the Network Support Processor.

FUNCTIONAL DESCRIPTION

It is the "firmware" that provides data communication capability to the Network Support Processor (NSP). The "firmware" refers to the instructions that are stored in the program PROM 50; firmware may be considered analogous to "software in a hardware form". Stored instructions allow the hardware to perform as a front-end communications processor.

Within the host computer 100, the NSP communications are handled by a MCP (master control program) routine which is known as DCC or Data Communications Control. A separate host computer DCC routine exists for each and every NSP in the data communications subsystem, which is designated as IODC or Input Output Data Communications Subsystem. The DCC initiates messages to the Network Support Processor (NSP) and receives messages back from the NSP. A "message" is a block of information followed by a longitudinal parity word (LPW) that checks the validity of the message contents.

Communications are conducted by means of messages that are called "requests" and "results". The messages (shown in Table III) are appended as the data component of the I/O Descriptor Word. A request message is sent from the host computer 100 to the NSP when a SEND message I/O Descriptor is initiated. A result message is sent from the NSP to the host computer when a GET message I/O Descriptor is initiated. In both message cases, a Result Descriptor that describes the result of a particular I/O operation, is sent from the NSP over to the host computer. The Result Descriptor is not the same as the "Result Message" as is seen in Table III.

TABLE III

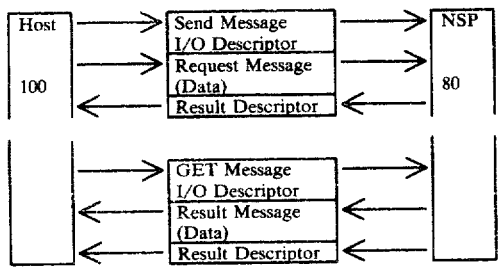

TABLE III-continued

Request and Result Message

The host computer and the Network Support Processor (NSP) use eight different message types as shown in Table IV.

TABLE IV

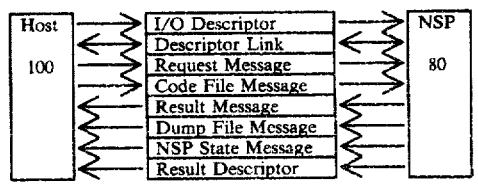

Message Types

An I/O Descriptor is a command from the host computer 100 that requires the NSP 80 to perform a certain operation. This command is followed by a Descriptor Link (D/L) that is used as a "job identifier". The job identifier is returned to the host computer at the start of every period during which information was transferred as a result of the I/O Descriptor that the Descriptor Link initially accompanied. A Result Descriptor is a message that describes the results of the I/O Descriptor execution cycle. Result Descriptors, Descriptor Links and I/O Descriptors were discussed and explained in the priorly cited patents incorporated by reference.

The remaining 5 message types are the data transfers that are performed in response to the various type of I/O Descriptors.

There are three specialized message types designated:
1. CODE FILE;
2. DUMP FILE;
3. NSP STATE.

The Code File message transfers the firmware data from the host computer to the Network Support Processor. A Dump File message is used to dump portions of the NSP memory back to the host computer. The NSP State message is used to report the current condition of the Network Support Processor to the host computer.

All the remaining messages are either "request" or "result" messages. The valid messages are shown and listed in Tables V and VI. In the Tables, the unlisted message codes are not used. Request messages are sent as the data portion of a SEND message operation. Result messages are returned to the host computer as the data portion of a GET message operation.

The ADD GROUP message adds a group to the subsystem. A group is a collection of station sets. A station set is defined as a set of stations that are jointly and physically acceptable. Each station is associated with only one station set. Each station set is associated with only one group. Thus, when a group is added to the subsystem, the entire collection of station sets and the stations in each station set is added to the system.

TABLE V

| | | Request Messages |
|---|---|---|
| Code | Message Type | Meaning |
| 01 | Add Controller | Adds Line Control Process code file to subsystem |
| 02 | Delete Controller | Removes Line Control Process after process no longer in use |

TABLE V-continued

Request Messages

| Code | Message Type | Meaning |
|---|---|---|
| 03 | Add Editor | Adds Editor code file to subsystem |
| 04 | Delete Editor | Removes Editor from subsystem after Editor no longer in use |
| 05 | Add Group | Adds group to subsystem |
| 06 | Delete Group | Removes group, associated stationsets, stations, and lines from subsystem |
| 07 | Add Line | Adds line to subsystem and activates Line Control Process for line |
| 08 | Delete Line | Removes line from subsystem |
| 09 | Add Station | Adds station to subsystem after corresponding stationset added |
| 0A | Delete Station | Removes station from subsystem after station no longer in use |
| 0B | Add Stationset | Adds stationset to subsystem after corresponding group added |
| 0C | Delete Stationset | Removes stationset and associated stations from subsystem after each station no longer in use; stationset removed after all stations removed |
| 0D | Add Translate Table | Adds translate table to subsystem |
| 0E | Delete Translate Table | Removes translate table after table no longer in use |
| 0F | Clear Adapter | Soft clears line adapter firmware |
| 10 | Dump Adapter | Dumps line data area in line adapter |
| 11 | Initialize Adapter | Initializes line adapter |
| 12 | Test Adapter | Tests state of line adapter |
| 13 | Ack Station | Acknowledges receipt of station input result message |
| 14 | Change Station Editor | Changes station Editor to Editor loaded in NSF by previous Add Editor request message |
| 15 | Make Station Not Ready | Makes a station NOT READY in firmware |
| 16 | Make Station Ready | Makes a station READY in firmware |
| 17 | Output | Sends output message to station |
| 18 | Clear LSP | Sends selective CLEAR to LSP controlled by NSP |
| 19 | Set Attribute | Sets value of certain parameters in specified line, station, or stationset |
| 1A | Set External | Sets value of specified station or line external variables |
| 1B | Set Global | Sets value of certain global Executive variables |
| 1C | Status | Requests either global Executive status information or the values of certain characteristics of a specified Line Control Process, Editor, group, stationset, station, translate-table, or line |

TABLE VI

Result Messages

| Code | Message Type | Meaning | F |
|---|---|---|---|
| 01 | Cleared Station | Station has been cleared | |
| 02 | Error | Unsuccessful attempt to receive from or transmit to station | |
| 03 | Input | Returns input message received from station | |
| 04 | Message Edit Error | Returns information about abnormal termination in Editor activation for station | |
| 05 | Output Status | Acknowledges output request for station when required | |
| 06 | Purged Output | Output request for station purged because station is cleared | * |
| 07 | Unprocessed Output | Output request for station discarded because station is cleared | * |
| 0F | Line Suspended | Main Line Control Process suspended | |
| 10 | Line EOT | Main Line Control Process terminated normally | |
| 11 | Dump Adapter Reply | Returns line adapter data information for line in response to Dump Adapter message | |
| 12 | Test Adapter Reply | Returns status information for line in response to Test Adapter message | |
| 13 | Switched Line Change | Returns information about changes in status of switched line | |
| 14 | Abnormal Termination | NSP or LSP S-Process terminated abnormally | |

TABLE VI-continued

Result Messages

| Code | Message Type | Meaning | F |
|------|--------------|---------|---|
| 15 | Ack Request | Request processed normally | |
| 16 | Rejected Request | Request rejected due to invalid information or precondition not satisfied | |
| 17 | Deleted | Line control process, Editor, group stationset, station, translate-table, or line deleted as requested | |
| 18 | Status Reply | Returns status information in response to status request | |
| 19 | Unsuccessful I/O | Returns information associated with an unsuccessful I/O attempt | |

NOTE
An asterisk in the F column indicates that the result message applies only to firmware, not to hardware.

Within the Network Support Processor, several firmware componets jointly insure communications with the host computer and the Line Support Processors (LSPs). These firmware components can be classified as follows:

(a) Manager
(b) Host Dependent Port (HDP) Control
(c) Executive
(d) Editor
(e) Line Control Process The host computer message level interface 15 in FIG. 1A (MLI) is used for communications between the host computer and the Network Support Processor (NSP) while the Network Support Processor message level interface $100_m$ (MLI) is used for communication between the Network Support Processor and the Line Support Processor (LSP). In FIG. 16 there is shown how the separate firmware components are used in transferring information between the Line Support Processor, the Network Support Processor and the host computer.

In FIG. 17 there is shown a firmware block diagram which illustrates where the different components are located and their relative size.

In the message transfer block diagram of FIG. 16 the Line Support Processor 300 is connected to the Network Support Processor 80 via the message level interface $100_m$. The NSP 80 is shown with the Executive firmware $80_{ex}$, the Line Control Process firmware $80_{1cp}$, and the Editor $80_{ed}$. NSP 80 connects through the DLI, $100_{ix}$, FIG. 1A over to the host computer 100, which includes a firmware DCC (Data Comm Control).

The firmware block diagram of FIG. 17 shows the Network Support Processor 80 as composed of two controllers, that is the MLI controller and the NDL controller. Both of these controller share the Memory 90. The NDL controller has a 2K PROM on the state machine designated Bootstrap $80_b$, and also a 32K RAM designated as Operating System Kernel $80_k$.

The MLI controller has an 8K PROM designated as Manager $80_m$ and also a 32K RAM designated HDP control $80_h$. The Manager $80_m$ connects via the MLI 15 to the host computer 100. The HDP control $80_h$ connects via MLI $100_m$ to the Line Support Processor, LSP 300.

MANAGER

The Manager (FIG. 17) is a software module that controls communication between the NSP and the host computer across the message level interface MLI 15. It has control of the MLI and performs the I/O operations. The majority of the firmware code $80_m$ is held in 8K words of the MLI state machine PROM designated 50, FIG. 3.

HDP CONTROL

The HDP Control (FIG. 17) drives a Network Support Processor and message level interface and provides an interface to the Executive $80_{ex}$. Firmware for the HDP Control is resident in the RAM portion of the memory ($66_m$) control card associated with a particular state machine.

EXECUTIVE

The Executive (FIG. 16) is a software module that performs most of the NSP data communication functions. It processes all the request messages from the host computer except for the OUTPUT Request Message. This particular message is passed on to the Line Control Process unit $80_{lcp}$. When the host computer requests a status result, the Executive returns an OUTPUT STATUS Result Message after the OUTPUT request is completed. The Executive sends Result messages to the host computer in response to both previously received Request messages and spontaneous subsystem events.

The components that make up the Executive $80_{ex}$ can be broadly classified as the Permanent Independent Runners, Interpreter, S-Processes, and the Operating System.

The firmware code for the Executive $80_{ex}$ resides in the RAM $66_n$, FIG. 15, of the NDL memory control card $66_b$ and also in a portion of Shared Memory 90. The remainder of the Shared Memory is dynamically allocated and de-allocated, as the activity in the network demands.

PERMANENT INDEPENDENT RUNNERS

The Permanent Independent Runners perform the handler functions for the NSP 80. These functions are independent of network configurations and station types. The code for the Independent Runners is loaded during initialization and exists in fixed locations of the Shared Memory 90. There are three Permanent Independent Runners which are:

(a) The HDP Handler
(b) Request Handler
(c) The Status Handler

The function of each Handler is summarized as follows:

HDP HANDLER

The HDP Handler manages all of the I/O operations between the NSP 80 and the LSP 300 and analyzes each operation for I/O errors. It coordinates with the HDP control (firmware) for proper routing of the I/O to the Line Support Processors 300. It receives and analyzes all the Result Descriptors from the LSP 300 and reports the status of all NSP-LSP I/O operations to the host computer 100.

REQUEST HANDLER

The Request Handler manages the Request message queue from the host computer 100 and services all Request messages (except for OUTPUT Request Messages). The OUTPUT Request Message is sent to an appropriate Editor component, if one is defined; it is then routed to the proper station destination. The Request Handler receives unqueued request messages from the Manager Component $80_m$.

STATUS HANDLER

The Status Handler is driven by the "HDP Handler". The primary function of this handler is to perform I/O operations for the HDP Handler. Specifically the Status Handler examines those I/O operations that are rejected by the Line Support Processor (LSP) and interrogates the LSP for the correct status of the Line Adapters involved. It uses this information to enable the HDP Handler to complete the original I/O operation.

S-PROCESSES

The S-Processes are collections of user defined code. The functions are dependent on the network configuration and the station types and the code is defined by the NDL program for a specific network. The code for an S-Process is individually loaded in the Executive $80_{ex}$ to perform specific tasks related to the network and is de-allocated when no longer required. The execution of each S-Process requires that the Interpreter be invoked. The Interpreter enables the code in the S-Process to be executed by the NDL state machine $50_b$. The editing and line control functions are typical examples of S-Processes. The scope of an S-Process can be understood by an understanding of the functions of the Editor and the Line Control Process.

INTERPRETER

An Interpreter is a "transient" Independent Runner. Unlike the Permanent Independent Runners, the transient Independent Runner is invoked for each S-Process that is activated and exists only as long as the S-Process exists. The interpreter translates the code contained in the S-Process and provides an interface to the Operating System routines.

OPERATING SYSTEM

The Operating System Support is provided to the Network Support Processor in the form of two routines; these are:
(a) Kernel routine
(b) Secondary routine

KERNEL ROUTINES

Kernel routines are a collection of routines or procedures, each of which performs a single Operating System Task. For example, to acquire space in the Shared Memory 90, a procedure called "GET-Space" is activated, and to release this space a procedure called "Forget-Space" is activated. Kernel routines are organized into seven levels or sub-groups in order to increase the modularity of the design. The Kernel $80_k$ is resident in the fast RAM ($66_n$) portion of the NDL memory control card $66_b$.

SECONDARY ROUTINES

Secondary Routines are a collection of routines or procedures, each of which provide a common subsystem function. These are tasks such as: Clear-Adapter; Clear-Station; and Notify Line, are accomplished by procedures which belong to this group.

EDITOR

Editor is a user-provided and user-defined routine within the NDL program. It is used to manipulate the text portion of the Request Message and Result Message according to the requirements of specific terminal types in the Data Communications Network. The code for the Editor exists in the Shared Memory 90 as a collection of S-Processes. Thus the code is derived from the user-written NDL program for the network and is dependent on the network configuration. The NDL compiler insures the transformation of the Editor into a collection of S-Processes.

When specified by the NDL, the Editor receives control from the Executive component when a "Request Message" is sent by the host computer to a terminal. This enables the Editor to edit the text portion of the "Request Message". The edited message is subsequently passed on to the firmware Line Control Process $80_{lcp}$ to be sent to a terminal. A similar process occurs in the reverse direction, when a host input is received from the network. The Editor receives control from the Line Control Process and can edit the text of the host input "Result Message".

LINE CONTROL PROCESS

This firmware component $80_{lcp}$ is also user-provided and user-defined in the NDL program. The Line Control Process manages both a line and all the terminals connected to the subsystem through that line. It is responsible for implementing the line protocol, for handling error recovery, and other functions. The code for this component exists in the Shared Memory 90 of the NSP 80 as a collection of S-Processes. The S-Processes representing the Line Control Process originates from the user-written NDL program for the network and is dependent on the network configuration. The NDL compiler insures the transformation of the Line Control Process to a collection of S-Processes.

The Line Control Process in FIG. 16 is activated for each line added to the network and executes in the NSP 80 so long as the line remains attached to the network. It receives the OUTPUT Request Message from the Executive components or from the Editor components, if specified. In turn, it formats the INPUT "Result Message" and sends it to the Executive or Editor for delivery to the host computer 100.

The Line Control Process is primarily responsible for communication between the NSP 80 and the LSP 300. This communication uses messages called "SIGNAL" from the NSP to the LSP (FIG. 16) and messages called "Reply" from the LSP 300 to the NSP 80. While communications between the host computer and the NSP are entirely defined by NSP firmware, communication betwen the NSP and LSP 300 is defined by the user through the NDL program for the network.

A "SIGNAL" is a message created by the Line Control Process and sent to LSP 300. The Line Support Processor (LSP) 300 directs the signal to the proper destination within the network. A SIGNAL has two fields:

(a) Message text field
(b) Control information field

The message text field consists of the text of the output request message from the host. The control information field consists of routing and other information for the LSP as defined by the NDL program.

A "Reply" is created by the NSP 300 and sent to the Line Control Process 80$_{lcp}$ in the NetworkSupport Processor 80. A "Reply" consists of two fields:

(a) Text field
(b) Control Information field

The Text field consists of the actual text that has entered the network. The Control Information field, appended to the text field, is used by the Line Control Process 80$_{lcp}$ to handle the text properly and to transmit the text to the host computer 100.

HOST COMPUTER TO NETWORK COMMUNICATION

A network message originates in the host computer 100. The message is sent across the MLI by means of a SEND message operation to the Network Support Processor 80 as a "Request". If an Editor is defined in the NDL program, the NSP can edit the text portion of the message. The edited message is then prepared for transmission to the LSP 300. Preparation is accomplished by re-formatting the message, under control of the Line Control Process firmware, into a SIGNAL. The SIGNAL is then passed to the Line Support Processor 300 across the MLI 100$_m$ between the NSP 80 and the LSP 300. The Line Support Processor 300 receives the signal and directs it to the proper destination in the network.

NETWORK TO HOST COMPUTER COMMUNICATION

The Line Support Processor (LSP 300) receives the text from the network and formats it into a Reply message for transmission to the Network Support Processor (NSP 80). When the Network Support Processor receives the Reply message, it re-formats the text portion into an "input result message". The text portion is edited if an Editor is specified. The edited "input result message" is then ready for transmission into the host 100. In order for the host computer 100 to receive the "input result messages" from the NSP 80 across the MLI, a "GET message I/O Descriptor" must be issued by the host computer 100.

TRANSLATE TABLE

A translate table provides the mechanism to translate the EBCDIC character-set used by the data communication subsystem to the character-set used on a specific data communications line. These translate tables are required by the NDL program.

DATA COMMUNICATIONS NETWORK

The I/O Data Communications Network (IODC) subsystem can interface a maximum of 256 data communications lines per host computer. The maximum configuration is derived by interfacing (as seen in FIG. 1A) four Network Support Processors (NSP) per host computer, four Line Support Processors (LSP) per each Network Support Processor (NSP) and 16 electrical interfaces (line adapters) for each Line Support Processor (LSP). Burroughs Data Communication Protocol allows data communication devices to be connected in series or parallel so that each data communications lines can service multiple nominally as many as ten) devices. Theoretically it is possible to attach 2560 data communication devices to one host computer.

The limiting factor in interfacing devices is the throughput that can be accommodated and the software utilized. In the case of the IODC subsystem, the limiting factor is the Line Support Processor (LSP) bandpass. The LSP 300 can process approximately 50K bits per second. A Network Support Processor (NSP) can support 10 to 15 terminals, such as the TD 830, operating at 9600 bauds or any mix that represents an equivalent workload. The exact number of terminals that can be accommodated depends on the average terminal throughput. This, in turn, depends on such factors as the average message length, the type of data, (keyboard or canned) acceptable response time and so on.

The Line Support Processor 300 is a unit composed of several slide-in cards which can be fitted into a base module. This unit will consist of a card for a UIO-state machine processor, a set of cards called "Quad LA" which means four line adapters are built into that card, and an interface card designated MLI/LA which designates the line adapter interface to the message level interface bus.

The data communications Line Adapter is basically a device which interfaces on one end to a data communications line electrical interface and on the other hand to a state machine processor (UIO-SM). The line adapter's primary functions are to serialize bit information from/to byte information, to provide timing, to generate service requests, to provide a RAM memory storage, to provide auto-call interfacing and provide connection to level changers to match the data communications line.

The byte-oriented line adapter can be arranged into basic configurations; a Quad line adapter and a Single line adapter. The Single line adapter is part of the Line Support Processor 300, and shares the same circuit board with the MLI, and is always required regardless of the quantity of communication lines controlled by the Line Support Processor. The Quad line adapter card contains four line adapters on the one board. These boards are slide-in boards which plug into the base module backplane.

The Line Adapter cards are connected together by means of frontplane cables to the state machine processor (UIO-SM). Connection to the data communications line is through an electrical interface board which cables to the Line Adapter. There are different types of electrical interface board that exist which may be cabled into different combinations on the Quad Line Adapters; thus, only the electrical interface board requires change depending on the data comm line electrical characteristics.

From one to 16 line adapters may be addressed by the state machine processor of the Line Support Processor. Each line adapter will be jumpered uniquely in order to identify its address.

Similar addressable components are contained on a line adapter which the state machine processor may communicate with in the form of write/read data or "status" or to provide control. Those addressable components in the line adapter are as follows: (a) USART; (b) Timer; (c) Auto-call output; (d) Auto-call Status; (e) component requestors; (f) memory.

The USART (Universal Synchronous/Asynchronous Receiver/Transmitter) accepts data bytes from the state machine processor and converts them into serial bits for transmission; it receives serial bit data and converts it to parallel data bytes. The device is initialized by writing into two control registers which specify the manner in which it operates. Various bits of the control registers specify such things as: (i) synchronous/asynchronous mode; (ii) bits per character; (iii) parity; (iv) Baud rate; (v) transparent mode; (vi) Echo mode.

Thus, the combination of the line adapter cards, a state machine processor card and a line adapter interface card form the Line Support Processor which is connected to the network through the backplane of the base module and also the frontplane connectors.

The data communications line adapter used here is an application-dependent device which is controlled by the state machine processor of the LSP 300. There are two basic types of line adapters which are available: (a) character oriented and (b) bit oriented.

Each of the these may have a variety of electrical interfaces to the data communications line.

One to 16 line adapters may be serviced by one LSP state machine processor. Each line adapter contains components which are addressable and can be serviced by the state machine processor with PUT or GET instructions. The components on the line adapter are serviced with one instruction or a series of instructions which, in some cases, provide sequential control for the components.

What is claimed is:

1. In a data communications network where a network support processor connects to a first and second distribution control circuit and wherein said first distribution control circuit connects one or more host computers to said network support processor and said second distribution control circuit connects one or more line communication processors to said network support processor, and wherein one of said host computers generates instructions for data transfer between said host computer and a line communication processor having data-communication lines to remote terminals, the network support processor comprising:
 (a) an interface circuit for providing asynchronous communication to said first distribution control circuit having connection to said host computer and for providing synchronous communication to said second distribution control circuit having connection to said line communications processor;
 (b) a shared memory, usable by a master processor controller means and said slave processor controller means, means for storing data undergoing transfer and for storing auxiliary programs for operation of said network support processor;
 (c) a master controller circuit including:
  (c1) master processor means for executing data transfer instructions received from said host computer and for controlling said interface circuit, a slave controller circuit, and a master memory control circuit;
  (c2) said master memory control circuit for controlling access to said shared memory means by said master processor means;
  (c3) first multiple bus means for connecting said master processor means, said master memory control circuit, said shared memory means and said interface circuit;
 (d) said slave controller circuit including:
  (d1) a slave processor means, initiated by said master processor means, for processing data being transferred to/from said line communications processor and said shared memory means via said master processor means and said interface circuit;
  (d2) a slave memory control circuit for controlling access to said shared memory means by said slave processor means;
  (d3) second multiple bus means for connecting said slave processor means, said slave memory control circuit, and said shared memory means.

2. In a data communications network where a subsystem-controller, designated as a network support processor, controls data transfer operations between main memory of a main host computer and a selected one of a plurality of line communications processors, each of said line communications processors managing data communications between itself and a plurality of remote terminals, a network support processor for executing data transfer instructions from said main host computer, said network support processor comprising:
 (a) an interface circuit for managing synchronous data transfers to/from said main host computer and for managing asynchronous data transfers to/from said line communications processor, said interface circuit operating under control of a master processor-controller means;
 (b) said master processor-controller means including:
  (b1) a first processor means for generating instructions and control signals for operation of said interface circuit and for operation of a slave processor-controller means;
  (b2) a first memory control circuit, connected to said first processor means, and including:
   (b2-1) first memory means for storing instructions and data for said first processor means;
   (b2-2) first memory logic means for generating memory addresses to access a shared memory, usable by said master processor controller means and said slave processor controller means ;
 (c) a slave processor-controller means including:
  (c1) a second processor means for accessing data in said shared memory means and operating to edit and to manage protocol format of said accessed data to provide compatibility with terminals which receive the accessed data, and wherein said second processor means returns said accessed data, after processing, to said shared memory means for subsequent transfer under instructions from said first processor means;
  (c2) a second memory control circuit, connected to said second processor means, and including:
   (c2-1) second memory means for storing instructions and data for said second processor means;
   (c2-2) second memory logic means for generating memory addresses to access said shared memory means;
 (d) said shared memory means for temporarily storing data being transferred between said main host computer and said line communications processor, and for storing additional programs for said first and second processor means;
 (e) bus means for connecting said first processor means to said first memory control circuit and said interface circuit, for connecting said second processor mean to said second memory control circuit, and for interconnecting said shared memory means to said first and second memory control circuits.

3. The network support processor of claim 2, wherein said bus means includes:
  (a) a first I/O bus connecting said first processor means to said first memory control circuit and to said interface circuit;
  (b) a first memory address bus connecting said first processor means to said first memory control circuit and to said interface circuit;
  (c) a first memory output bus connecting said first processor means to said first memory control circuit and to said interface circuit;
  (d) a second I/O bus connecting said second processor means to said second memory control circuit;
  (e) a second memory address bus connecting said second processor means to said control memory control circuit;
  (f) a second memory output bus connecting said second processor means to said second memory control circuit;
  (g) a first and second data bus respectively connecting said shared memory means with said first and second memory control circuits;
  (h) a third and fourth memory address bus respectively connecting said shared memory means with said first and second memory control circuits.

4. The network support processor of claim 2, wherein each of said first and second memory logic means of each of said first and second memory control circuit includes:
  (a) an adder for adding together a first input, representing a memory address from said first or second processor means, to a second input, representing address data from a base address register loaded by said first or second processor means, and said adder providing an extended memory address, which is the sum of said first and second inputs, for said shared memory means;
  (b) a first input to said adder for carrying a memory address from said first or second processor means;
  (c) a base address register for storing address data received from said first or second processor means and providing said second input to said adder;
  (d) means to request access to data in said shared memory and which is at said extended memory address.

5. The network support processor of claim 4, wherein said first memory control circuit includes:
  (a) a module select logic unit for simultaneously comparing the said extended memory addresses requested by said first and said second memory control circuits, and for selecting access priority, if both said first and second memory control circuits request access to the same shared memory address at the same time.

6. The network support-processor of claim 2, wherein said interface circuit includes:
  (a) a first (DLI) interface logic means for controlling synchronous data transfers between said shared memory means and said main memory of said host computer, said first interface logic means including:
    (a1) PROM sequencing means, initiated by said first processor means, and functioning to operate a data shifting circuit for bidirectional movement of data words between said main host computer and said shared memory means;
    (a2) a said data shifting circuit having connection means to said host computer and to said shared memory means;
  (b) a second (MLI) interface logic means for controlling asynchronous data transfers between said shared memory means and a selected line communications processor, said second interface logic means including:
    (b1) control logic means operating under instructions from said first processor means, and functioning to transfer data between said shared memory means and said selected line communications processor, wherein said control logic means operates to select the transfer of data in either (i) a direct memory access mode, or (ii) a non-direct memory access mode;
    (b2) first channel means for transfer of each individual data word, during said non-direct memory access mode, between said shared memory means and said selected line communications processor, by a single individual instruction from said first processor means to said control logic means;
    (b3) second channel means for transfer of blocks of data words, during said direct memory access mode, between said shared memory means and said selected line communications processor by a single individual direct memory access instruction from said first processor means to said control logic means.

* * * * *

UNITED STATES PATENT AND TRADEMARK OFFICE
CERTIFICATE OF CORRECTION

PATENT NO. : 4,430,710                    Page 1 of 2
DATED      : February 7, 1984
INVENTOR(S): Robert D. Catiller, et al.

It is certified that error appears in the above-identified patent and that said Letters Patent is hereby corrected as shown below:

```
Col.  2, line  3, change "Conald" to --Donald--;
         line  8, change "Einput/output" to --input/output--;
         line 24, change "work" to --word--.
Col.  5, line 19, after "Processor," insert --80, FIG. 1A,--;
         line 20, delete "80, FIG. 1A,".
Col.  6, line  5, change "is" to --in--.
Col.  7, line 58, delete "a";
         line 62, change "a syn-" to --asyn- --.
Col.  8, line 30, after "(FIG. 1B)" insert --of--;
         line 47, change "the", second occurrence, to --to--.
Col.  9, line 24, change "50ib." to --50b.--;
         line 30, change "reuires" to --requires--;
         line 39, change "prom" to --PROM--;
         line 42, change "consits" to --consist--.
Col. 11, line 39, after "4,301,505" insert --that--.
Col. 15, line 13, change "as" to --of--.
Col. 16, line 35, change "intergrated" to --integrated--;

line 41, change "105a, to --105i,--.
Col. 18, line 11, change "66a" to --66a--;
         line 29, after "on" insert --to--;
         line 51, change "cntroller" to --controller--;
         line 57, change "105;" to --105i--.
Col. 19, line 39, change "foregroud" to --foreground--.
Col. 20, line  9, change "hold" to --holds--;
         line 29, change "of", first occurrence, to --on--.
```

UNITED STATES PATENT AND TRADEMARK OFFICE
CERTIFICATE OF CORRECTION

PATENT NO. : 4,430,710

DATED : February 7, 1984

INVENTOR(S) : Robert D. Catiller, et al.

It is certified that error appears in the above-identified patent and that said Letters Patent is hereby corrected as shown below:

```
Col. 22, line 22, change "PCC 41'," to --PC 41',--.
Col. 27, line 52, change "controller" 2nd occurrence to --controllers--
Col. 32, line  2, change "nominally" to --(nominally--;
         line 51, change "board" to --boards--.
Col. 34, line 68, change "mean" to --means--.
Col. 35, line 17, change "control" to --second--.
```

Signed and Sealed this

Fifth Day of February 1985

[SEAL]

Attest:

DONALD J. QUIGG

Attesting Officer

Acting Commissioner of Patents and Trademarks